United States Patent [19]

Iijima et al.

[11] Patent Number: 5,035,489
[45] Date of Patent: * Jul. 30, 1991

[54] LIQUID CRYSTAL DEVICE HAVING TWO SUPER TWISTED NEMATIC CELLS

[75] Inventors: Chiyoaki Iijima; Yuzuru Sato; Hiroshi Wada; Osamu Okumura; Satoshi Kamada, all of Suwa, Japan

[73] Assignee: Seiko Epson Corporation, Tokyo, Japan

[*] Notice: The portion of the term of this patent subsequent to Jul. 4, 2006 has been disclaimed.

[21] Appl. No.: 343,987

[22] Filed: Apr. 27, 1989

[30] Foreign Application Priority Data

| May 19, 1986 | [JP] | Japan | 61-114299 |
| Jul. 22, 1986 | [JP] | Japan | 61-172142 |
| Jul. 22, 1986 | [JP] | Japan | 61-172143 |
| Jul. 22, 1986 | [JP] | Japan | 61-172144 |
| Dec. 19, 1986 | [JP] | Japan | 61-303168 |
| Apr. 28, 1988 | [JP] | Japan | 63-106192 |

[51] Int. Cl.$^5$ .............................................. G02F 1/13
[52] U.S. Cl. ................................. 350/335; 350/347 R; 350/347 E
[58] Field of Search ................ 350/335, 347 E, 347 R

[56] References Cited

U.S. PATENT DOCUMENTS

| 4,408,839 | 10/1983 | Wiener-Avnear | 350/335 |
| 4,436,379 | 3/1984 | Funada et al. | 350/335 |
| 4,664,482 | 5/1987 | Kando et al. | 350/347 E |
| 4,715,686 | 12/1987 | Iwashita et al. | 350/339 R |
| 4,844,569 | 7/1989 | Wada et al. | 350/335 |
| 4,941,737 | 7/1990 | Kimura | 350/335 |
| 4,952,029 | 8/1990 | Hayashi et al. | 350/335 |

FOREIGN PATENT DOCUMENTS

| 0022217 | 1/1981 | European Pat. Off. | 350/335 |
| 0110216 | 8/1980 | Japan | 350/335 |

Primary Examiner—Stanley D. Miller
Assistant Examiner—Anita Pellman Gross
Attorney, Agent, or Firm—Blum Kaplan

[57] ABSTRACT

An electro-optical device includes at least two adjacent transparent twisted nematic liquid crystal cells, each cell having a twisted nematic liquid crystal with a twist angle greater than 90° between a pair of spaced apart opposed substrates with electrodes selectively disposed thereon. A linear polarizer is disposed on an exterior surface of each of the two cells. One of the two cells includes a plurality of electrodes for selectively producing a desired display. Application of a suitable voltage to the second cell compensates for changes in ambient temperature conditions or undesirable thicknesses in the liquid crystal materials of the two cells to ensure that a monochromatic display having excellent contrast is produced by the device and compensates for elliptically polarized light emitted by the first cell so that the device produces substantially linearly polarized light.

28 Claims, 12 Drawing Sheets

LIQUID CRYSTAL DEVICE HAVING TWO SUPER TWISTED NEMATIC CELLS

CROSS-REFERENCE TO RELATED APPLICATION

This application is a continuation-in-part of U.S. patent application Ser. No. 07/052,816, filed May 19, 1987 which has issued as U.S. Pat. No. 4,844,569 on July 4, 1989.

BACKGROUND OF THE INVENTION

This invention relates generally to an electro-optical device, and more particularly to a liquid crystal display device which includes at least two liquid crystal cells with each cell having transparent electrodes disposed on the opposed substrates.

Liquid crystal display devices including two liquid crystal cells have been provided. The first liquid crystal cell has a pair of substrates with liquid crystal material filled in the space between two substrates. Transparent electrodes are deposited on the inner surface of each substrate such that the transparent electrodes face each other. By applying a voltage across opposed electrodes, a display is produced by the first liquid crystal cell. The second liquid crystal cell includes in the space between the pair of substrates the liquid crystal material. However, transparent electrodes are not included in the substrates of the second cell. Thus, the second liquid crystal cell cannot by itself produce a display. The first and second liquid crystal cells are disposed between the facing surfaces of a pair of polarizing plates. Ideally, a black and white display having a high contrast is produced by the device.

FIG. 18 illustrates an exploded perspective view of one such conventional liquid crystal display device 100 including two cells. A first liquid crystal cell 110 and a second liquid crystal cell 120 are positioned between a lower polarizing plate 101 and an upper polarized plate 102. First liquid crystal cell 110 includes a lower e substrate 111 having an electrode 111a on its upper interior surface and an upper electrode substrate 112 having an electrode 112a on its lower interior surface. A liquid crystal material 113 fills the space between lower electrode substrate 111 and upper electrode substrate 112. By applying a voltage between electrode 111a and electrode 112a across the liquid crystal material a display is produced. Second liquid crystal cell 120 includes a lower substrate 121 and an upper substrate 122 with a liquid crystal material 123 filling the space therebetween.

The angle between the axial direction of liquid crystal molecules in contact with lower electrode substrate 111 and the polarizing axis (absorbing axis) of lower polarizing plate 110 is generally about 20° to 70°. As incident linear polarizing light passes through lower polarizer 101 it becomes linearly polarized. The linear polarizing light changes to elliptically (oval) polarizing light as it passes through first liquid crystal cell 110. The elliptical characteristics of the polarizing light are based on the refractive index anisotropy Δn, thickness d and twist angle of the liquid crystal material of first liquid crystal cell 110. The waveforms of the elliptical polarizing light have different major axial directions. The elliptical polarizing light also has different eccentricities. Eccentricity is defined as follows:

$$e=(a^2-b^2)^{\frac{1}{2}}/a \leq 1$$

wherein a=the major axis of the elliptical polarizing light and b=the minor axis of the elliptical polarizing light.

As the elliptical polarizing light passes through second liquid crystal cell 120, the major axial directions of wavelengths in the visible range of the elliptically polarizing light are redirected so as to be are substantially the same. The twist angle and the product Δn·d (μm) of second axial (rubbing) directions of the liquid crystal molecules in contact with lower substrate 121 of second liquid crystal cell 120 and in contact with upper electrode substrate 112 of first liquid crystal cell 110 are predetermined and set. Consequently, eccentricities e of the elliptically polarizing light are about 1 with respect to the waveforms within the visible range produced by second liquid crystal cell 120. Linear polarized light produced by second liquid crystal cell 120 results. Depending on the polarizing (absorbing) axis of polarizer 102, linear polarizing light is emitted by device 100 as white light. When the twist angle or product of birefringence Δn and thickness d (Δn×d) of first liquid crystal cell 110 changes, the twist angle and Δn×d of second liquid crystal cell 120 must be changed to ensure that white light can be produced by device 100.

In one embodiment of liquid crystal display device 100 first liquid crystal cell 110 has Δn·d set to approximately 0.9 μm and a twist angle to the left of approximately 200° (wherein the twist direction of the liquid crystal molecules extends from upper substrate 112 to lower substrate 111). Second liquid crystal cell 120 has Δn·d equal to approximately 0.7 μm and a twist angle to the right of approximately 150° (wherein the twist direction of the liquid crystal molecules extends from upper substrate 122 to lower substrate 121). The angle between the polarizing (absorbing) axis of upper polarizing plate 102 and the axial (rubbing) direction of the liquid crystal molecules in contact with upper substrate 122 of second liquid crystal cell 120 is approximately 40°. The angle between the axial (rubbing) direction of the liquid crystal molecules in contact with lower substrate 121 of second liquid crystal cell 120 and the axial (rubbing) direction of the liquid crystal molecules in contact with upper electrode substrate 112 of first liquid crystal cell 110 is approximately 90°. The angle between the axial (rubbing) direction of liquid crystal molecules in contact with lower electrode substrate 111 of first liquid crystal cell 110 and the polarizing (absorbing) axis of lower polarizer 101 is approximately 50°.

FIG. 19 illustrates the transmittance spectrum for the ON/OFF states of liquid crystal display device 100 based on the above-noted parameters. Selective/nonselective voltages are applied based on a multiplex drive having a 1/100 duty. High and low transmittance ratios are defined as the OFF and ON states, respectively. A pair of curves I and II represents the OFF and ON states, respectively. The amount of light transmitted through device 100 is shown along the ordinate based on suitable arbitrary units (AU).

Conventional liquid crystal display devices such as device 100 generally provide acceptable black and white displays. However, the refractive (refrax) index anisotropies Δn of first liquid crystal cell 110 and second liquid crystal cell 120 change based on the ambient temperature. Thus, a colored display, such as green or red rather than white is produced by liquid crystal display device 100 at certain ambient temperatures. The color of the display is based on the properties of liquid crystal materials 113 and 123 of first liquid crystal cell 110 and second liquid crystal cell 120, respectively. A colored rather than a monochromatic black and white display is also produced by device 100 when thicknesses d of liquid crystal material 113 and liquid crystal material 123 are erroneously beyond their predetermined values.

Accordingly, it is desirable to provide an electro-optical device which produces a monochromatic black and white display and which is not adversely influenced by changes in the ambient temperature conditions or by thicknesses d of the liquid crystal material which exceed their predetermined values.

SUMMARY OF THE INVENTION

Generally speaking, in accordance with the invention, an electro-optical device includes at least two twisted nematic liquid crystal cells, each including a pair of spaced apart opposed substrates with transparent electrodes selectively disposed thereon. The opposed substrates each have a liquid crystal orientation direction and a twisted nematic liquid crystal material disposed in the space between the substrates. A linear polarizer is disposed on exterior surfaces of the first twisted nematic liquid crystal cell and the second twisted nematic liquid crystal cell.

Linearly polarized light passing through the polarizer is emitted from the first twisted nematic liquid crystal cell as elliptically polarized light and is emitted from the second twisted nematic liquid crystal cell so that substantially linearly polarized light is produced by the device. When the ambient temperature conditions or thickness of the liquid crystal materials of the first and/or second cells are not at their predetermined values, application of a suitable voltage to the electrodes of the second cell will produce a monochromatic black and white display having excellent contrast.

The electro-optical device can also include at least one third twisted nematic liquid crystal cell including a pair of third spaced apart opposed substrates with electrodes selectively disposed on the opposed third substrates. Each of the third substrates has a liquid crystal orientation direction. The third cell also includes a twisted nematic liquid crystal material disposed in the space between the third substrates. The liquid crystal materials of the first and second cells are twisted in opposite directions.

In a preferred embodiment of the invention one of the pair of substrates in the first cell is in contact with one of the pair of the substrates in an adjacent cell in the form of one integral substrate. In another preferred embodiment of the invention at least one of the second substrates has at least two electrodes which preferably overlap one another. Light which passes through the first twisted nematic liquid crystal cell forms a display region which can be either greater than or less than the region encompassed by the electrodes of the second substrates which overlap one another.

In another alternative embodiment of the invention, the product of refractive index of anisotropy $\Delta n$ and thickness d of the second twisted nematic liquid crystal cell is greater than the product of the refractive index anisotropy $\Delta n$ and thickness d of the first twisted nematic liquid crystal cell. By providing that the product of the second cell is greater than the product of the first cell when no voltage is applied to either the electrodes of the first cell or the electrodes of the second cell, the device can produce a monochromatic black and white display with excellent contrast.

Accordingly, it is an object of the invention to provide an improved liquid crystal display device.

Another object of the invention is to provide an improved liquid crystal display device which provides a monochromatic display having excellent contrast.

A further object of the invention is to provide an improved liquid crystal display device which is not adversely influenced by changes in ambient temperature in producing a monochromatic display.

A still further object of the invention is to provide an improved liquid crystal display device which is not adversely influenced by the layer thickness of each cell not being at its predetermined value in producing a monochromatic display.

Still other objects and advantages of the invention will in part be obvious and will in part be apparent from the specification.

The invention accordingly comprises the features of construction, a combination of elements and arrangements of parts which will b exemplified in the construction hereinafter set forth and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENT

Figure 1:
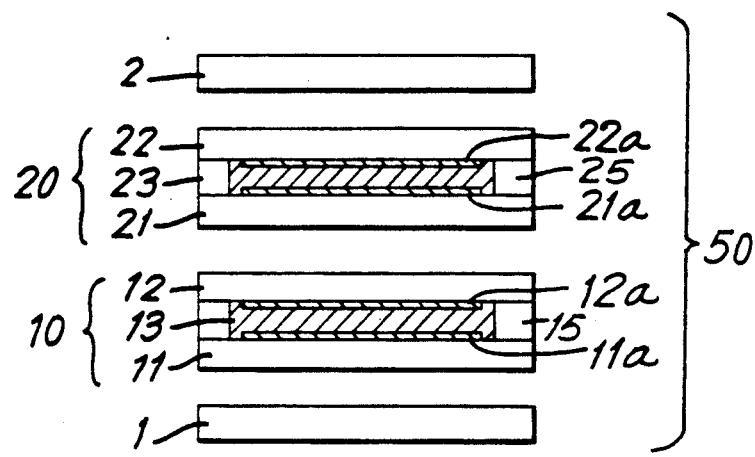
FIG. 1 is an exploded cross-sectional view of an electro-optical device in accordance with one embodiment of the invention.

As shown in FIG. 1, an electro-optical device 50 includes a lower polarizing plate 1, an upper polarizing plate 2, a first liquid crystal cell 10 and a second liquid crystal cell 20. First liquid crystal cell 10 provides a display based on voltage applied to a pair of transparent electrodes 11a and 12a formed on opposing surfaces of a lower substrate 11 and an upper substrate 12, respectively (hereinafter also referred to a lower electrode substrate 11 and upper electrode substrate 12). A first twisted nematic liquid crystal material 13 is placed in a space between lower electrode substrate 11 and upper electrode substrate 12. A spacer 15 spaces lower electrode substrate 11 from upper electrode substrate 12.

Second liquid crystal cell 20 includes a pair of transparent electrodes 21a and 22a formed on opposing interior surfaces of a lower substrate 21 and an upper substrate 22, respectively (hereinafter referred to as lower electrode substrate 21 and upper electrode substrate 22). A spacer spaces lower electrode substrate 21 from upper electrode substrate 22. A twisted nematic liquid crystal material 23 fills the space between lower electrode substrate 21 and upper electrode substrate 22. Lower polarizing plate 1 and upper polarizing plate 2 are disposed on the exterior surfaces of lower electrode substrate 11 and upper electrode substrate 22, respectively.

Figure 2:
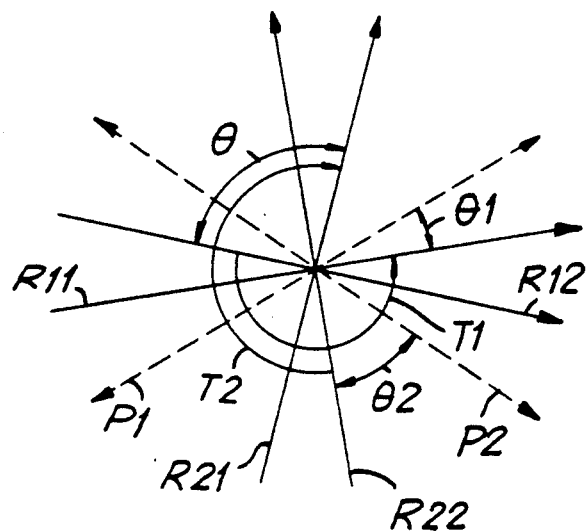
FIG. 2 diagrammatically illustrates various axial and rubbing directions of the device of FIG. 1.

FIG. 2 illustrates the relative directions of the axes and orientations of device 50. The interior surfaces of electrode substrates 11, 12, 21 and 22 are rubbed to cause an alignment of the liquid crystal material which is adjacent thereto. When assembled, the rubbing directions cause the liquid crystal materials 13 and 23 to be twisted between their associated upper and lower electrode substrates (hereinafter referred to as the twist angle). Device 50 can be a positive or negative type display.

Lower electrode substrate 11 and upper electrode substrate 12 of cell 10 are rubbed in directions denoted by a pair of arrows R11 and R12, respectively. Similarly, lower electrode 21 and upper electrode substrate 22 of cell 20 are rubbed in directions denoted by a pair of arrows R21 and R22, respectively. Rubbing direction R12 of upper electrode substrate 12 of first cell 10 forms an angle θ with rubbing direction R21 of lower electrode substrate 21 of second cell 20 which is about, but not necessarily limited to, 90°. Cell 10 and cell 20 have a pair of twist angles T1 and T2, respectively. Lower polarizing plate 1 and upper polarizing plate 2 have a pair of polarizing (absorbing) axes P1 and P2, respectively. An angle $\theta_1$ is formed between polarizing P1 of lower polarizing plate 1 and rubbing direction R11 of lower electrode substrate 11. An angle $\theta_2$ is formed between polarizing axis P2 of upper polarizing plate 2 and rubbing direction R22 of upper electrode substrate 22. Twist angles T1 and T2 of liquid crystal materials 13 and 23, respectively, are based on twisting the nematic liquid crystals from their respective upper electrode substrates to their respective lower electrode substrates.

Transparent electrode substrates and 12 and transparent electrode substrates 21 and 22 are energized based on an applied voltage having, for example, but not limited to, a 1/100th duty cycle ratio. In one embodiment of the invention, a high level of transmittance is obtained in the OFF state and a low level of transmittance is obtained in the ON state. Cells 10 and 20, in all embodiments of the invention, employ twisted nematic liquid crystal materials. These liquid crystal materials include, but are not limited to, phenyl cyclohexane (PCH) and biphenyl cyclohexane (BCH) species which can be mixed with twisted nematic liquid crystals of the

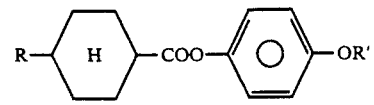

species. The same or different liquid crystal compositions can be used for cell 10 and cell 20. Preferably, however, the same nematic liquid crystal composition is used in cell 10 as in cell 20 since the mismatching of birefringence dispersion between cell 10 and cell 20 can be easily overcome.

In order to obtain and maintain the necessary twist of the liquid crystal molecules, a chiral dopant is added to the composition. The dopant serves as an optical activator and may be CB-15 (a product of BDH Corp.) which cause the spiral structure of the crystals to twist to the right or S-811 (a product of Merck Corporation). The liquid crystal materials 13 and 23 of cells 10 and 20, respectively, twist angles T1 and T2 and the values of n·d are not limited to any particular range.

Suitable liquid crystal compositions for liquid crystal materials 13 and 23 (and all other liquid crystal materials disclosed herein) include, but are not limited to, SS4008 of the CHISSO Corporation or the following compositions:

Composition 1:

$C_3H_7$—H—COO—⌬—$OC_4H_9$    18%

$C_4H_9$—H—COO—⌬—$OC_9H_7$    18%

$C_3H_7$—H—COO—⌬—$OC_2H_5$    18%

$C_2H_5$—⌬—⌬—CN    11%

$C_4H_9$—⌬—⌬—CN    14%

$C_5H_9$—⌬—⌬—$OC_7H_7$    5%

$C_3H_7$—H—⌬—COO—⌬—$C_3H_7$    5%

$C_3H_7$—H—⌬—COO—⌬—$C_5H_{11}$    6%

-continued

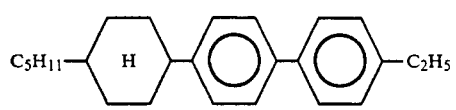 5%

Composition 2:

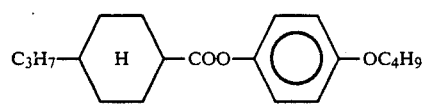 18%

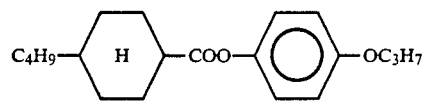 18%

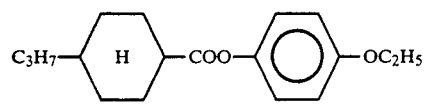 18%

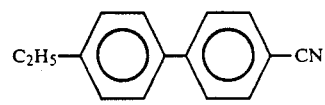 14%

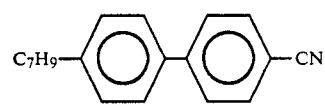 16%

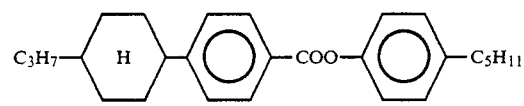 6%

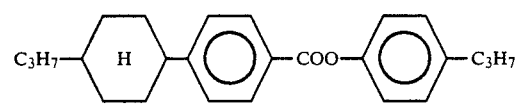 5%

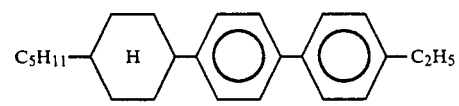 5%

Device 50 provides an excellent display when the parameters such as, but not limited to, twist angle T2 and n·d of cell 20 are changed to compensate for the eccentricities of the respective wavelengths and differences in the major axes of the elliptically polarized light produced by cell 10. The conditions under which device 50 provides an excellent display are set forth in the following examples; it being understood that these examples are merely for illustrative purposes.

EXAMPLE 1

Twist angle T1 and $\Delta n \cdot d$ of cell 10 are approximately 200° to the left and approximately 0.9 µm, respectively. Angle $\theta$ is approximately 90°. Angles $\theta_1$ and $\theta_2$ fall within a range of about 30°–60°. Twist angle T2 and $\Delta n \cdot d$ of cell 20 fall within the ranges represented by the oblique lines of FIG. 3. Display 50 provides an excellent display. The monochromatic contrast is greatest near the center of each range of oblique lines compared to the peripheral portions within each range of oblique lines.

EXAMPLE 2

Cell 10 has twist angle T1 of approximately 200° to the left and $\Delta n \cdot d$ of approximately 0.9 µm. Angle $\theta$ is approximately 90°. Angles $\theta_1$ and $\theta_2$ are each about 40°. Cell 20 has twist angle T2 of approximately 140° to the right and $\Delta n \cdot d$ of approximately 0.7 µm. FIG. 4 illustrates the transmittance spectrum of device 50. Twist angle T2 and $\Delta n \cdot d$ of cell 20 are represented by a point A in FIG. 3. Curve I represents the OFF state and Curve II represents the ON state of device 50.

EXAMPLE 3

Cell 10 has twist angle T1 of approximately 200° to the left and $\Delta n \cdot d$ of approximately 0.9 µm. Angle $\theta$ is approximately 90°. Angle $\theta$ is approximately 50° and $\theta_2$ is approximately 40°. Cell 20 has twist angle T2 of approximately 200° to the right and $\Delta n \cdot d$ of 0.9 µm.

EXAMPLE 4

Cell 10 has twist angle T1 of approximately 200° to the left and $\Delta n \cdot d$ of approximately 0.9 µm. Angle $\theta$ is approximately 90°. Angles $\theta_1$ and $\theta_2$ are each approximately 40°. Cell 20 has twist angle T2 of approximately 260° to the right and $\Delta n \cdot d$ of approximately 0.8 µm. Device 50 in Examples 2, 3 and 4 provides an excellent display with exceptional contrast.

EXAMPLE 5

Cell 10 has twist angle T1 of approximately 250° to the left and $\Delta n \cdot d$ of approximately 0.9 µm. Angle $\theta$ is approximately 90°. Angles $\theta_1$ and $\theta_2$ are in a range of approximately 30°–60°. Cell 20 has twist angle T2 and $\Delta n \cdot d$ within the ranges represented by the oblique lines of FIG. 5. Device 50 provides a white display in the OFF state and a black display in the ON state. An excellent monochromatic device is provided.

EXAMPLE 6

Cell 10 has twist angle T1 of approximately 250° to the left and $\Delta n \cdot d$ of approximately 0.9 µm. Angle $\theta$ is approximately 90°. Angles $\theta_1$ and $\theta_2$ are approximately 40°. Cell 20 has twist angle T2 of approximately 160° to the right and $\Delta n \cdot d$ of approximately 0.8 µm.

EXAMPLE 7

Cell 10 has twist angle T1 of approximately 250° to the left and $\Delta n \cdot d$ of approximately 0.9 µm. Angle $\theta$ is approximately 90°. Angles $\theta_1$ and $\theta_2$ are approximately 40°. Cell 20 has twist angle T2 of approximately 360° to the right and $\Delta n \cdot d$ of approximately 1.0 µm.

EXAMPLE 8

Twist angle T1 and $\Delta n \cdot d$ of cell 10 are approximately 170° to the left and approximately 0.7 µm, respectively. Angle $\theta$ is approximately 90°. Angle $\theta_1$ is approximately 40° and angle $\theta_2$ is approximately 50°. Cell 20 has twist angle T2 of approximately 70° to the right and $\Delta n \cdot d$ is approximately 0.7 µm.

EXAMPLE 9

Figure 6:
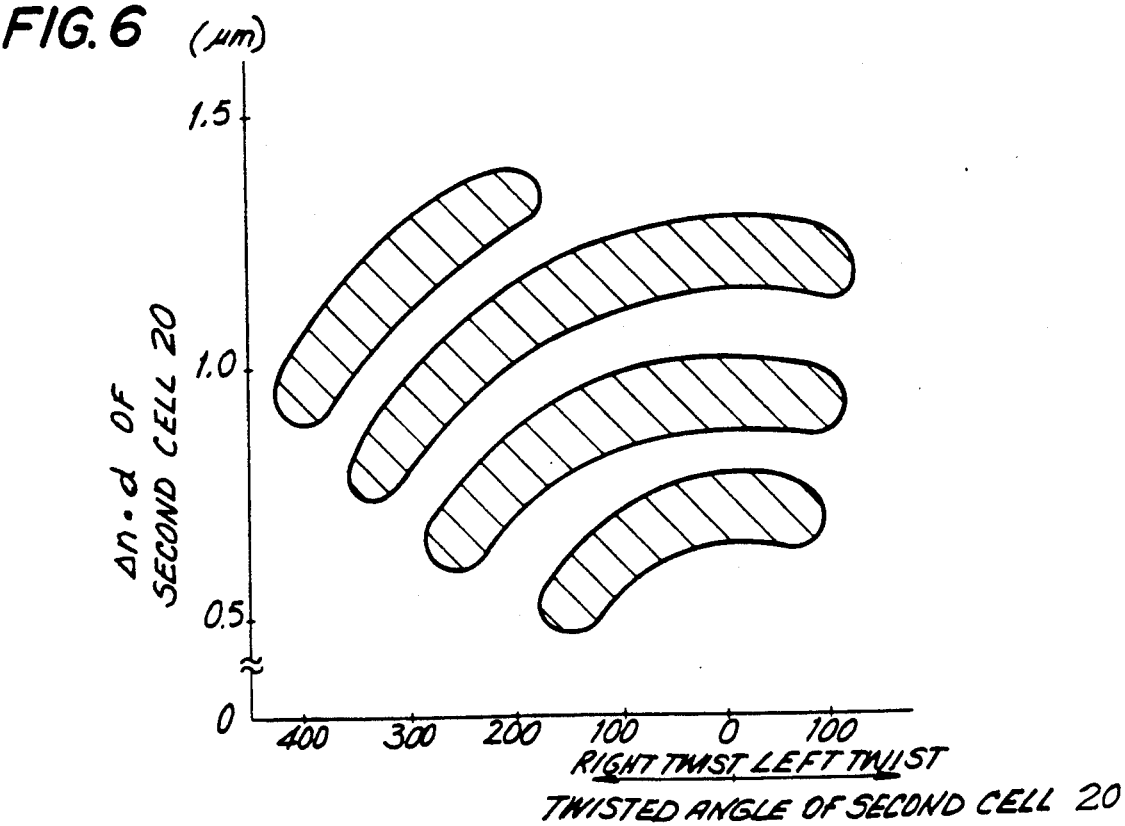

Cell 10 has twist angle T1 of approximately 120° to the left and $\Delta n \cdot d$ of approximately 0.9 µm. Angle $\theta$ is approximately 90°. Angles $\theta_1$ and $\theta_2$ fall within a range of 30°–60°. Cell 20 has twist angle T2 and $\Delta n \cdot d$ within ranges represented by the oblique lines of FIG. 6.

EXAMPLE 10

Figure 7:
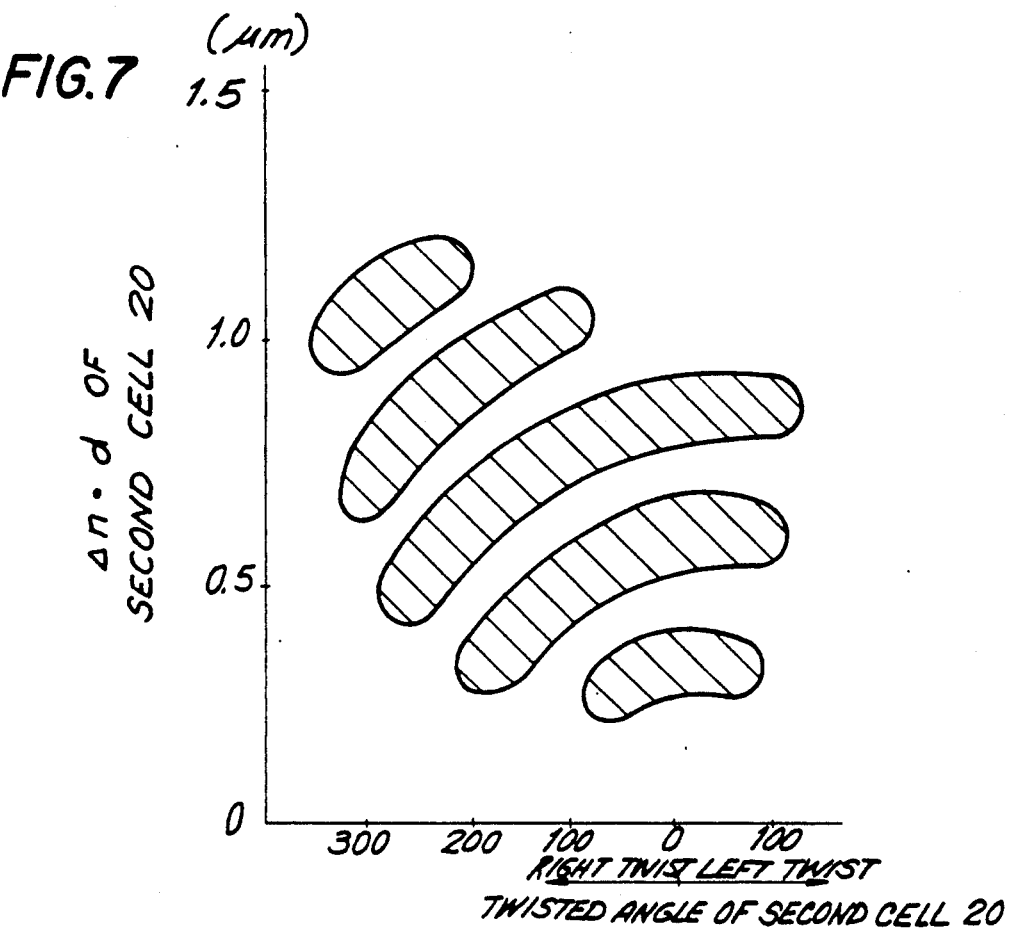

Cell 10 has twist angle T1 of approximately 200° to the left and Δn·d of approximately 0.6 μm. Angle θ is approximately 90°. Angles $\theta_1$ and $\theta_2$ fall within the range of 30°-60°. Cell 20 has twist angle T2 and Δn·d within the ranges represented by the oblique lines of FIG. 7.

EXAMPLE 11

Figure 8:
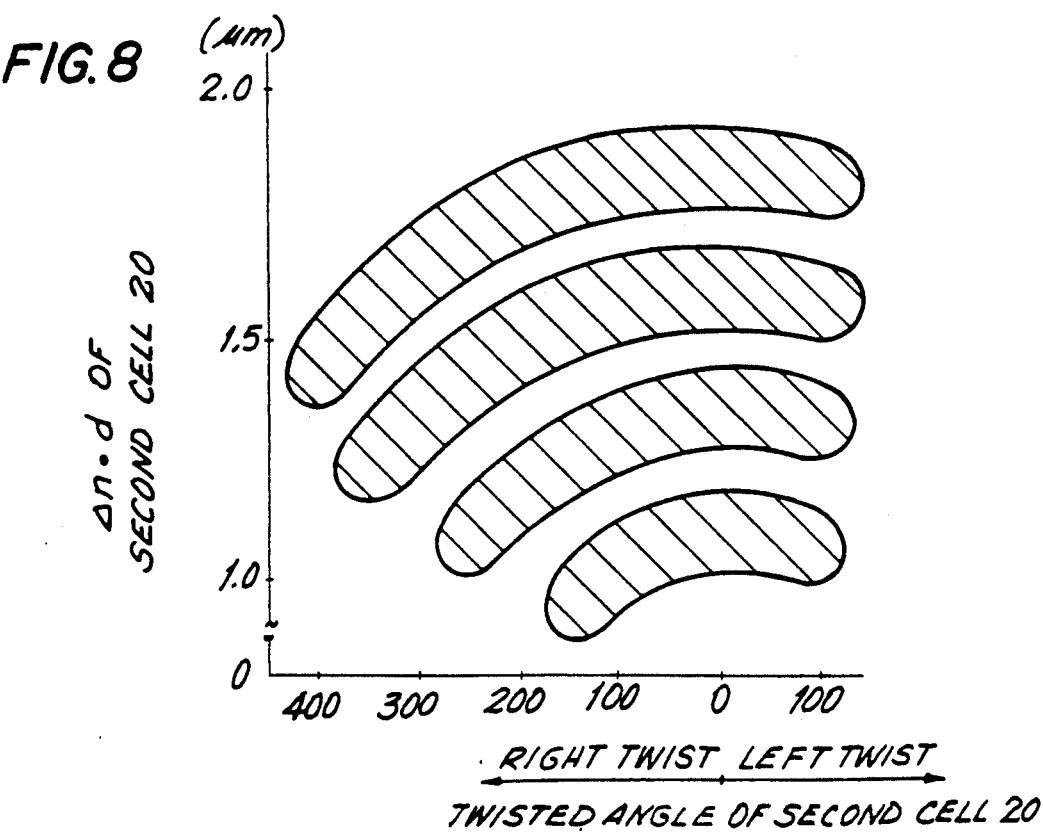

Cell 10 has twist angle T1 of approximately 200° to the left and Δn·d of approximately 1.5 μm. Angle θ is approximately 90°. Angles $\theta_1$ and $\theta_2$ are in the range of 30°-60°. Cell 20 has twist angle T2 and Δn·d within the ranges represented by the oblique lines of FIG. 8.

In the above examples, when the ambient temperature surrounding device 50 changes, the value of refractive index anisotropy n changes resulting in display 50 producing other than a monochromatic black and white display. Additionally, when thickness d of liquid crystal material 13 or liquid crystal material 20 is not at its predetermined value, it is impossible to provide an excellent black and white display.

To ensure that a monochromatic black and white display is produced by device 50 when the ambient temperature changes and/or thicknesses d of liquid crystal materials 13 and 23 are not at their predetermined values, a predetermined voltage is applied to electrodes 21a and 22a of cell 20. Alignment of liquid crystal material 23 changes. Refractive index anisotropy Δn also changes whereby Δn·d of cell 20 is substantially the same as Δn·d of cell 10. Any coloring of the display is eliminated producing a sharp and increased contrast in the display produced by device 50. If desired, changes or control in the color of the display produced by device 50 can be provided by changing the voltage applied to electrodes 21a and 22a of cell 20.

Figure 9:
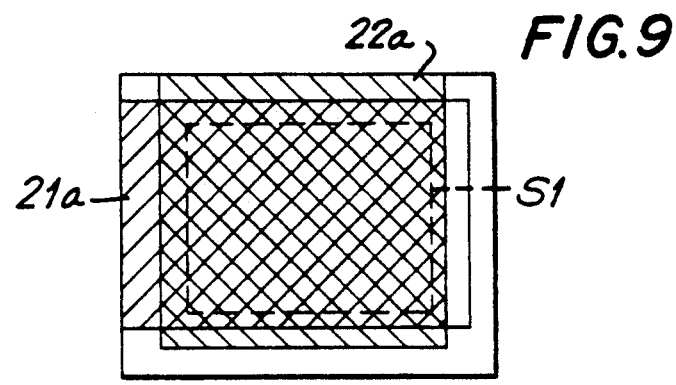
FIGS. 9–11 are diagrammatic plan views illustrating positions of electrodes in liquid crystal cell display devices constructed in accordance with the invention.
Figure 10:
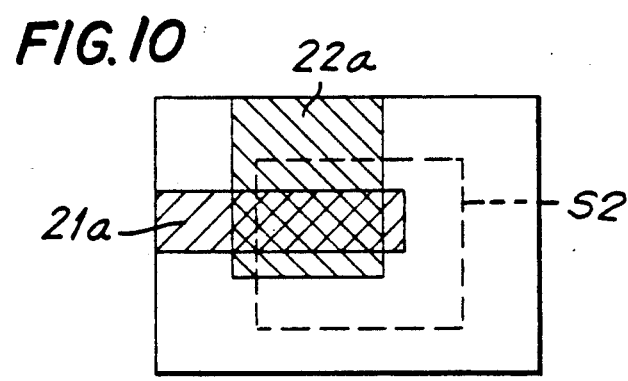
Figure 11:
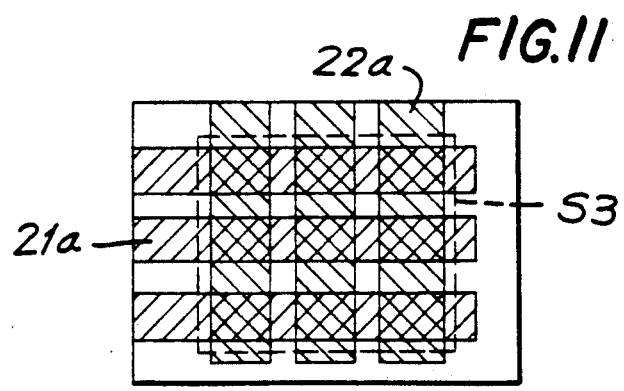

Electrodes 21a and 22a of cell 20 can be constructed in a number of different patterns on electrode substrates 21 and 22, respectively. A plurality of electrodes also can be provided on at least one of electrode substrates 21 and 22. Electrodes 21a and 22a overlap one another in at least the display region of cell 10. FIGS. 9 to 11 illustrate construction of electrodes 21a and 22a in three different patterns as viewed from the top of device 50.

As shown in FIG. 9, a display region S1 of cell 10 is represented by a dashed line. Electrode 21a is made from a single electrode. Similarly, electrode 22a is made from a single electrode. Electrodes 21a and 22a overlap in a region which is broader than display region S1 of cell 10. A suitable voltage is applied between electrodes 21a and 22a to eliminate any the entire display produced by device 50. Contrast is increased.

As shown in FIG. 10, electrodes 21a and 22a are each made from a single electrode. Electrodes 21a and 22a overlap one another in a region which is partially within and partially outside of a display region S2 (represented by dashed lines) of cell 10.

The region in which electrodes 21a and 22a overlap one another and which is within display region S2 is smaller than display region S2. A suitable voltage is applied between electrodes 21a and 22a of cell 20. An increase in contrast is provided by device 50 in the overlapped portion.

As shown in FIG. 11, at least one of electrodes 21a and 22a include two or more electrodes wherein electrodes 21a and 22a overlap one another in two or more regions. A display region S3 of cell 10 is represented by dashed lines. The overlapped region of electrodes in cell 20 is narrower than display region S3 of cell 10. A suitable voltage is applied between electrodes 21a and 22a to provide a display having excellent contrast.

When the refractive index anisotropy Δn of cell 10 is different than the refractive index anisotropy Δn of cell 20 due to an increase or decrease in the ambient temperature, the display produced by device 50 in the OFF state may not be white. Refractive index anisotropy Δn of cell 10 can be changed to an appropriate value by applying a voltage between electrodes 21a and 22a of cell 20 to provide a white display in the OFF state. The white display can be obtained using any of the electrode patterns shown in FIG. 9-11. Electrode terminals of upper substrate 22 and lower substrate 21 of cell 20 can be connected to (drawn from) one of the upper and lower substrates of cell 10 by conductor. The same high contrast results are obtained.

Figure 12:
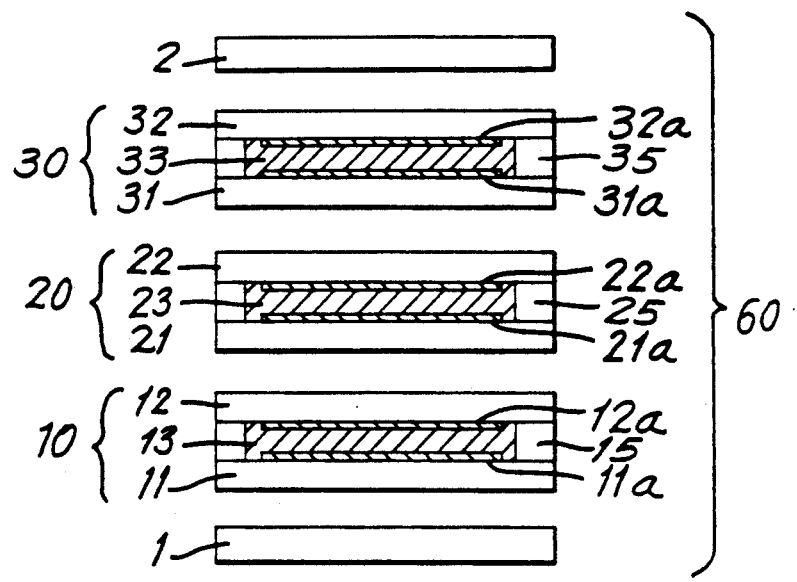
FIG. 12 is an exploded cross-sectional view of an electro-optical device in accordance with an alternative embodiment of the invention.

An electro-optical device 60 in accordance with an alternative embodiment of the invention is shown in FIG. 12. Elements illustrated in FIG. 12 which are constructed and operate in the same manner as shown in FIG. 1 are represented by like reference numerals. Device 60 includes a third liquid crystal cell 30. Cell 30 includes a lower transparent electrode substrate 31 and an upper transparent electrode substrate 32 which are spaced apart by a spacer 35. A twisted nematic liquid crystal material 33 is provided in the space between substrates 31 and 32. A pair of electrodes 31a and 32a are formed on opposing surfaces of substrates 31 and 32, respectively. Cell 30 is similar to cell 20. Voltages applied to cell 30 and cell 20 can be adjusted to eliminate any color in the display region of device 60. Accordingly, a monochromatic black and white display is produced by device 60.

Preferably, at least one of the liquid crystal materials 23 and 33 are different from the twist direction of liquid crystal material 13. The positional relationship among cells 10, 20 and 30 can assume other positions and is not limited to the relationship shown in FIG. 12. Alternatively, three or more liquid crystal cells serving the same purpose as cell 20 can be employed.

In FIGS. 1 and 12, adjacent substrates of adjacent cells can be formed as one substrate. For example, upper substrate 12 of cell 10 may be integrally formed with lower substrate 21 of cell 20 as one substrate. Alternatively, an adhesive layer of, for example, polyvinyl butyryl film obtained by an embossing finish is placed between the cells and heat and/or pressure is applied to achieve adhesion between the cells. A heat-cured epoxy, urethane or ultraviolet acrylic adhesive also can be employed. By joining cell 10 to cell 20, reflection of light on the boundary surface of both cells is minimized, if not eliminated.

Alternative embodiments of the invention are as follows:

EMBODIMENT 1

First cell 10 includes liquid crystal material having a phase change temperature $T_{NI}$ of about 100° C., refractive index anisotropy Δn of about 0.1 operating at an ambient temperature of about 40° C. Second cell 20 includes liquid crystal material 23 having phase change temperature $T_{NI}$ of about 60° C., refractive index anisotropy Δn of about 0.1 at an ambient temperature of 40° C. Angles $\theta_1$ and $\theta_2$ are the same as set forth in Example 3. The product Δn·d of cells 10 and 20 are each 0.9 μm at an ambient temperature of 40° C. The value of $\Delta n$ of cell 10 and cell 20 is about 0.110 and 0.124 at 0° C., respectively. The values of $\Delta n \cdot d$ of cells 10 and 20 are listed below in Table 1.

TABLE 1

|  | First cell 10<br>$T_{N1} = 100°$ C. | Second Cell 20<br>$T_{N1} = 60°$ C. |
| --- | --- | --- |
| $\Delta n \cdot d$ (40° C.) (μm) | 0.900 | 0.900 |
| $\Delta n \cdot d$ (0° C.) (μm) | 0.994 | 1.116 |

Device 50 produces a monochromatic black and white display when the ambient temperature is 40° C. but produces an undesirable color display when the ambient temperature is 0° C. Application of a suitable voltage to electrodes 21a and 22a of cell 20 reduces the product $\Delta n \cdot d$ resulting in a monochromatic black and white display at ambient temperatures of 0° C. Accordingly, device 50 produces a display having excellent contrast at an ambient temperature of 0° C. by applying a suitable voltage to electrodes 21a and 22a of cell 20.

EMBODIMENT 2

Cell 10 and cell 20 have phase change temperatures $T_{N1}$ of about 60° C. and 100° C., respectively. Angles $\theta$, $\theta_1$ and $\theta_2$ and twist angles T1 and T2 are the same as set forth in Example 3. Cell 10 and cell 20 each have $\Delta n \cdot d$ of approximately 0.9 at 0° C. but have different values at 40° C. The values of $\Delta n \cdot d$ are listed below in Table 2.

TABLE 2

|  | First cell 10<br>$T_{N1} = 60°$ C. | Second cell 20<br>$T_{N1} = 100°$ C. |
| --- | --- | --- |
| $\Delta n \cdot d$ (0° C.) (μm) | 0.900 | 0.900 |
| $\Delta n \cdot d$ (40° C.) (μm) | 0.726 | 0.814 |

Figure 13:
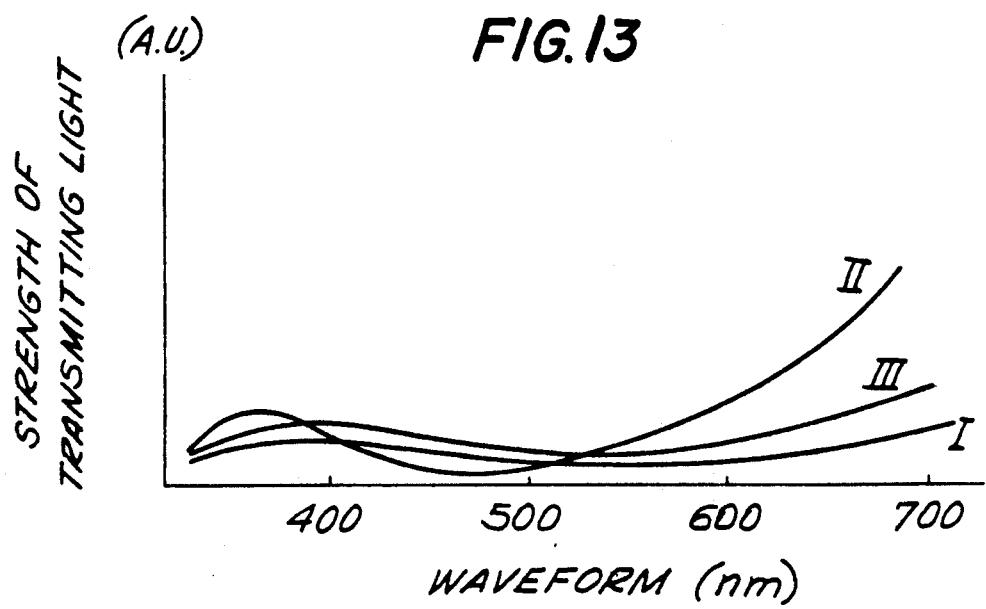
FIGS. 13 and 14(A)–14(D) are plots of transmittance versus wavelength for devices constructed in accordance with the invention.
Figure 14:
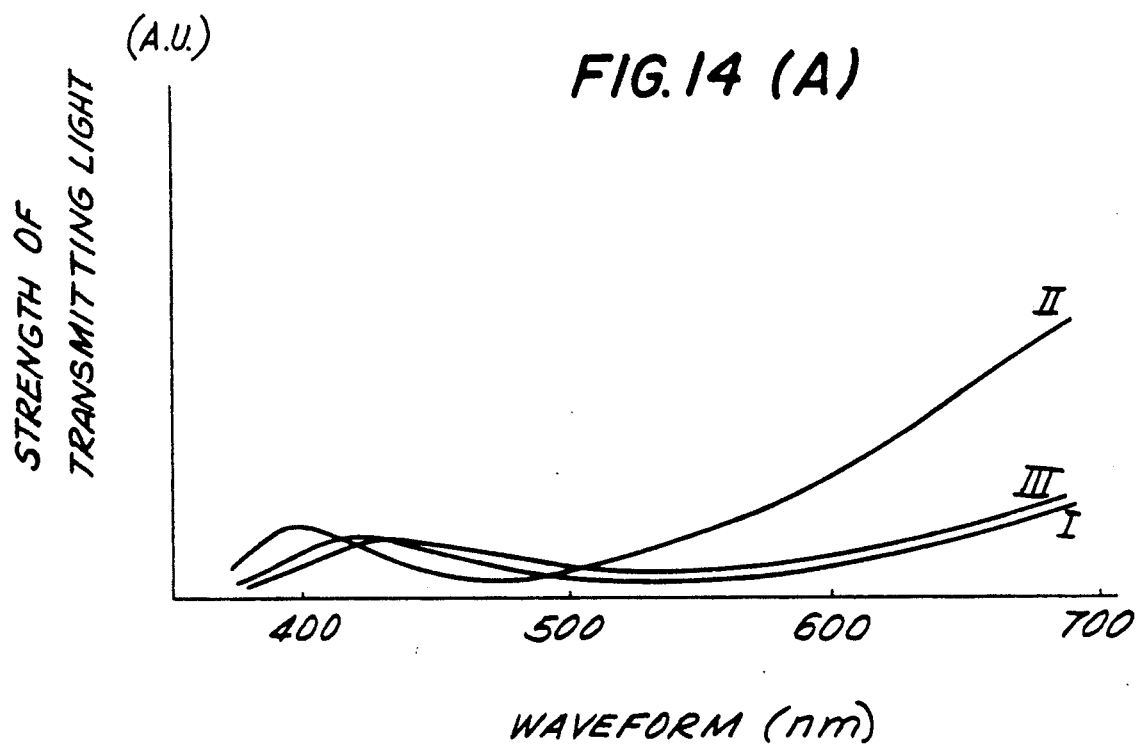
Figure 14:
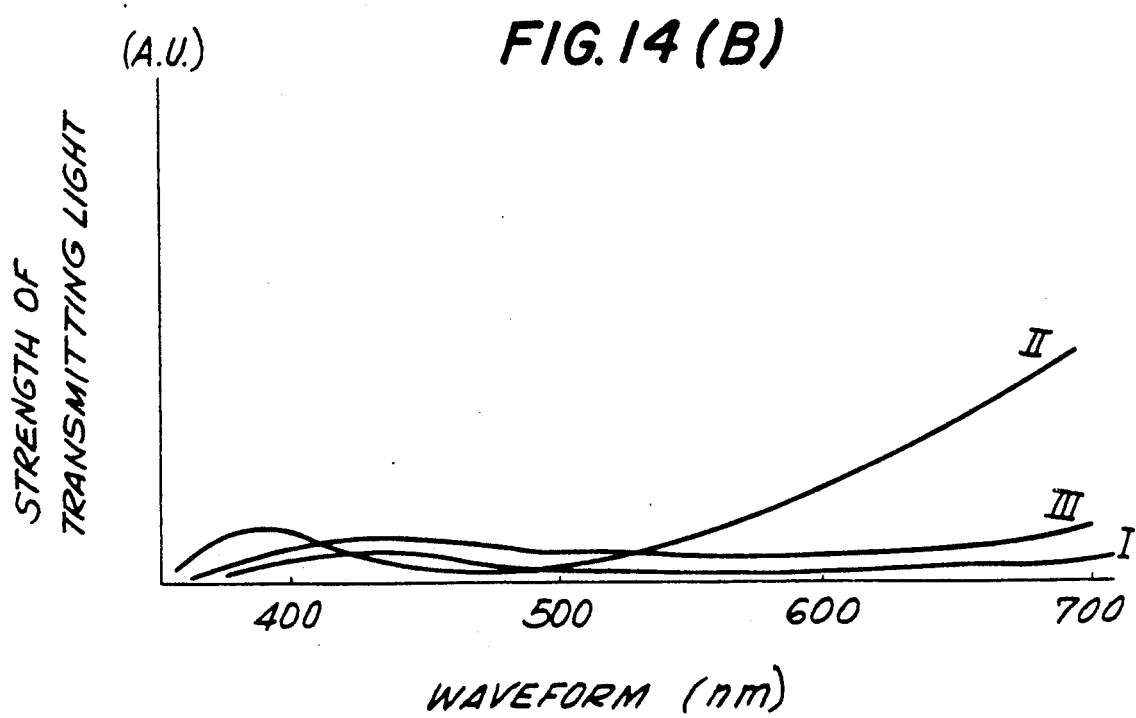
Figure 14:
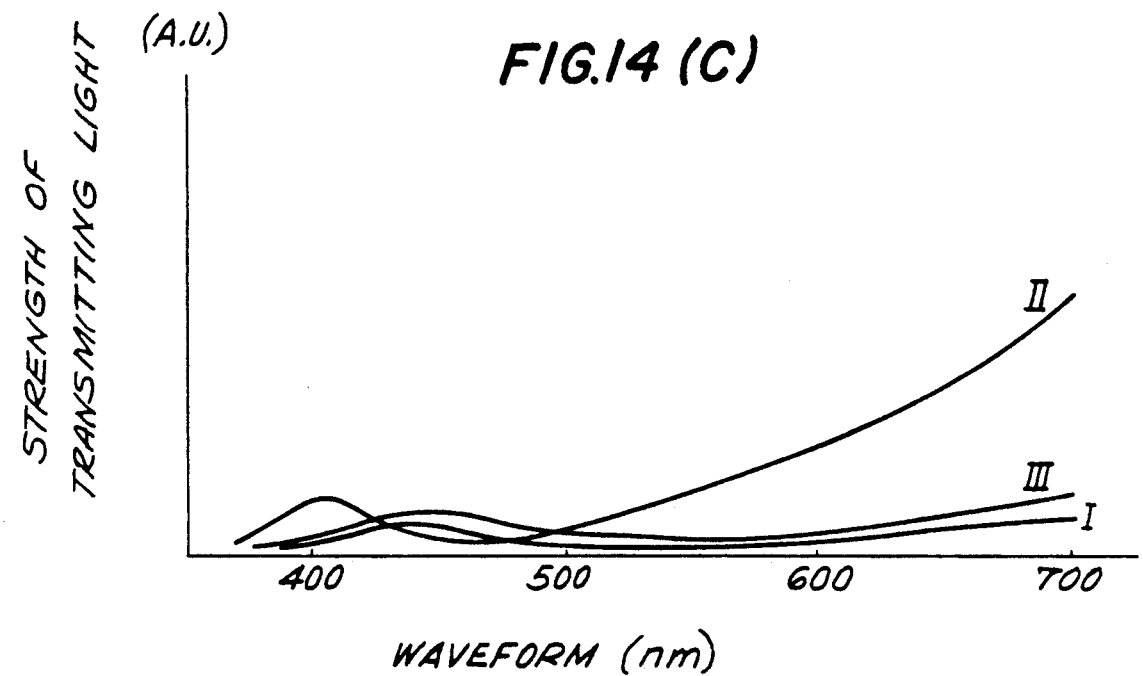
Figure 14:
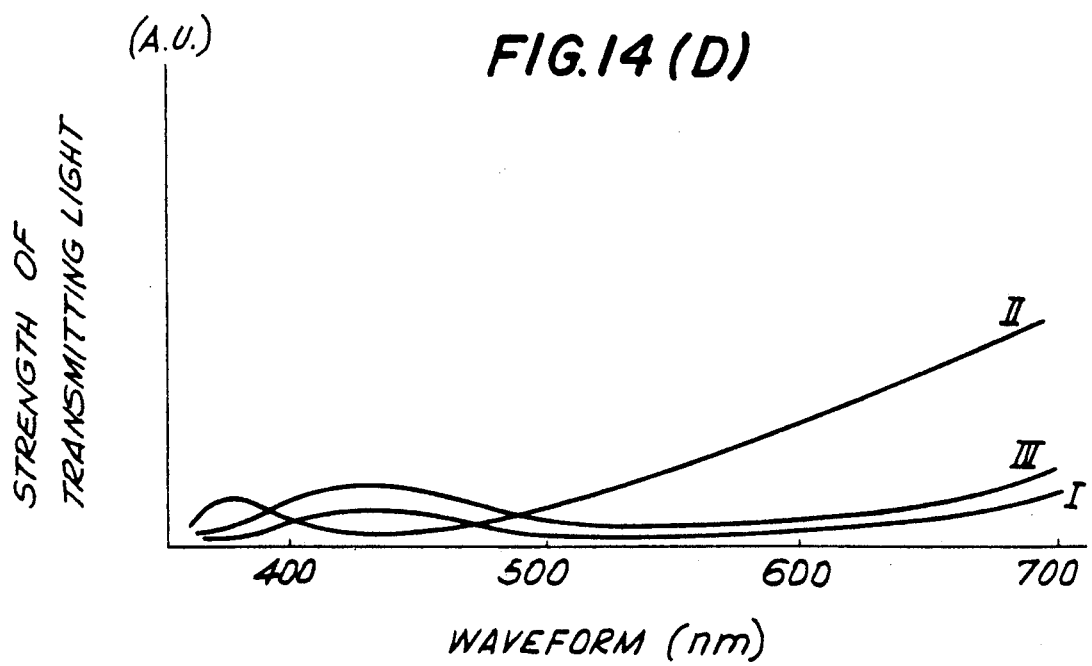

A colored display is produced by device 50 at an ambient temperature of 40° C. when no voltage is applied to electrodes 21a and 22a of cell 20. By providing a suitable voltage across electrodes 21a and 22a, however, a monochromatic black and white display having excellent contrast is produced by device 50 at an ambient temperature of 40° C. The transmittance spectrum for producing a black display when a suitable voltage is applied to cell 20 is illustrated in FIG. 13. Curves I and II illustrate the transmittance spectrum when the ambient temperature of device 50 is about 0° C. and 40° C. without applying a voltage across electrodes 21a and 22a of cell 20, respectively. Curve III represents the transmittance spectrum when a suitable voltage is applied to electrodes 21a and 22a of cell 20 at an ambient temperature of 40° C.

EMBODIMENT 3

Cell 10 and cell 20 have phase change temperatures T1 of about 100° C. and 60° C., respectively. Angles $\theta$, $\theta_1$, $\theta_2$, T1 and T2 are the same as set forth in Example 2. Cell 10 and cell 20 have $\Delta n \cdot d$ of approximately 0.9 and 0.7 at an ambient temperature of 40° C., respectively. The values of $\Delta n \cdot d$ of cells 10 and 20 at 0° C. vary from each other as listed below in Table 3.

TABLE 3

|  | First cell 10<br>$T_{N1} = 100°$ C. | Second cell 20<br>$T_{N1} = 60°$ C. |
| --- | --- | --- |
| $\Delta n \cdot d$ (40° C.) (μm) | 0.900 | 0.700 |
| $\Delta n \cdot d$ (0° C.) (μm) | 0.994 | 0.868 |

By applying a suitable voltage to electrodes 21a and 22a a monochromatic black and white display having excellent contrast at ambient temperature of 0° C. and 40° C. is obtained. When no voltage is applied to electrodes 21a and 22a, however, device 50 produces an undesirable colored display.

EMBODIMENT 4

Cell 10 and cell 20 have phase change temperatures $T_{N1}$ of about 60° C. and 100° C., respectively. Angles $\theta$, $\theta_1$, $\theta_2$, T1 and T2 are the same as set forth in Example 2. The values of $\Delta n \cdot d$ are listed below in Table 4.

TABLE 4

|  | First cell 10<br>$T_{N1} = 60°$ C. | Second cell 20<br>$T_{N1} = 100°$ C. |
| --- | --- | --- |
| $\Delta n \cdot d$ (0° C.) (μm) | 0.900 | 0.700 |
| $\Delta n \cdot d$ (40° C.) (μm) | 0.726 | 0.633 |

When no voltage is applied to electrodes 21a and 22a of cell 20, an undesirable color display is produced by device 50. An appropriate voltage applied to cell 20 produces a monochromatic black and white display having excellent contrast.

EMBODIMENT 5

As set forth below, Table 5 lists the values of $\Delta n \cdot d$ of cell 10 and cell 20 based on the construction of device 50 set forth in Examples 2, 3 and 6. The actual values of refractive index anisotropy $\Delta n$, thickness d at predetermined and actual values and $\Delta n \cdot d$ at predetermined and actual values of cell 20 are also set forth in Table 5.

TABLE 5

|  |  | First cell 10 $\Delta n \cdot d$ (μm) | Second cell 20 | | | |
| --- | --- | --- | --- | --- | --- | --- |
|  |  |  | $\Delta n$ | d pre-determined value (μm) | d actual value (μm) | $\Delta n \cdot d$ pre-determined value (μm) | $\Delta n \cdot d$ actual value (μm) |
| A | Ex. 2 | 0.9 | 0.100 | 7.0 | 7.2 | 0.70 | 0.72 |
| B | Ex. 2 | 0.9 | 0.100 | 7.0 | 7.3 | 0.70 | 0.73 |
| C | Ex. 3 | 0.9 | 0.125 | 7.2 | 7.4 | 0.90 | 0.925 |
| D | Ex. 6 | 0.9 | 0.100 | 8.0 | 8.2 | 0.80 | 0.82 |

FIGS. 14(A)–14(D) illustrate the transmittance spectrums produced by device 50 based on conditions A-D set forth in Table 5, respectively. In FIGS. 14(A)–14(D), curves I represents the transmittance spectrums when thickness d of liquid crystal material 23 of cell 20 is at a predetermined value. Curves II of FIGS. 14(A)–14(D) represents the transmittance spectrum when the actual values are different from the predetermined values of thickness d of liquid crystal material 23 and when no voltage is applied to cell 20. Curves III illustrates the transmittance spectrums when the actual thickness d is different from the predetermined thickness d of liquid crystal material 23 but when a suitable voltage is applied to cell 20.

Conditions A and B of Table 5 are based on Example 2 with different actual values of thickness d of cell 20.

EMBODIMENT 6

As set forth below, Table 6 lists the conditions for Examples 2, 3 and 6. In contrast to Table 5, however, variations in thickness d at predetermined and actual values and $\Delta n \cdot d$ at predetermined and actual values for cell 10 rather than cell 20 are listed. Similar to Table 5, the transmittance characteristics for a black display are represented by FIGS. 14(A)–14(D). By applying a voltage to electrodes 21a and 22a of cell 20, a monochromatic black and white display having excellent contrast is obtained.

Conditions A and B of Table 6 are based on Example 2 with different actual values of thickness d of cell 10.

TABLE 6

| | | Second cell 20 $\Delta n \cdot d$ ($\mu$m) | First cell 10 | | | | |
|---|---|---|---|---|---|---|---|
| | | | $\Delta n$ | d predetermined value ($\mu$m) | d actual value ($\mu$m) | $\Delta n \cdot d$ predetermined value ($\mu$m) | $\Delta n \cdot d$ actual value ($\mu$m) |
| A | Ex. 2 | 0.70 | 0.15 | 6.0 | 5.9 | 0.9 | 0.885 |
| B | Ex. 2 | 0.70 | 0.15 | 6.0 | 5.8 | 0.9 | 0.870 |
| C | Ex. 3 | 0.90 | 0.15 | 6.0 | 5.8 | 0.9 | 0.870 |
| D | Ex. 6 | 0.80 | 0.15 | 6.0 | 5.7 | 0.9 | 0.855 |

Figure 3:
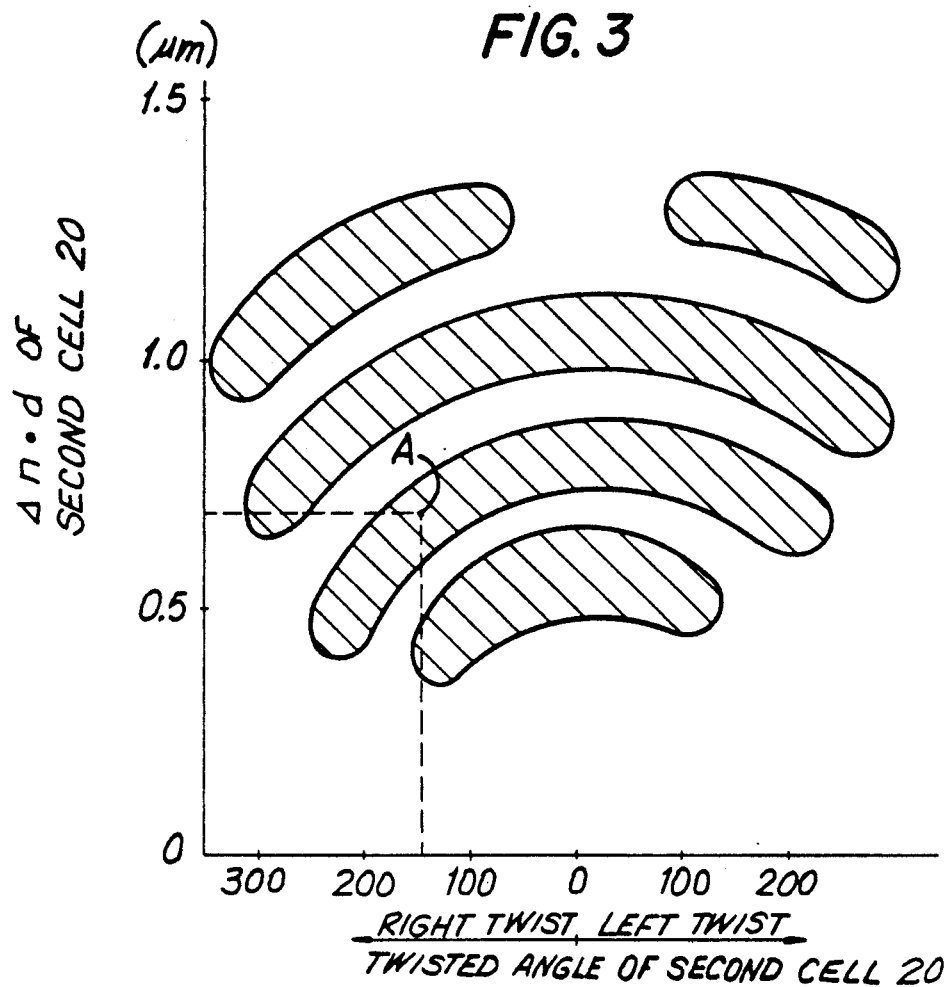
FIG. 3 is a plot of $\Delta n \cdot d$ versus twist angle of the upper liquid crystal cell of FIG. 1.
Figure 4:
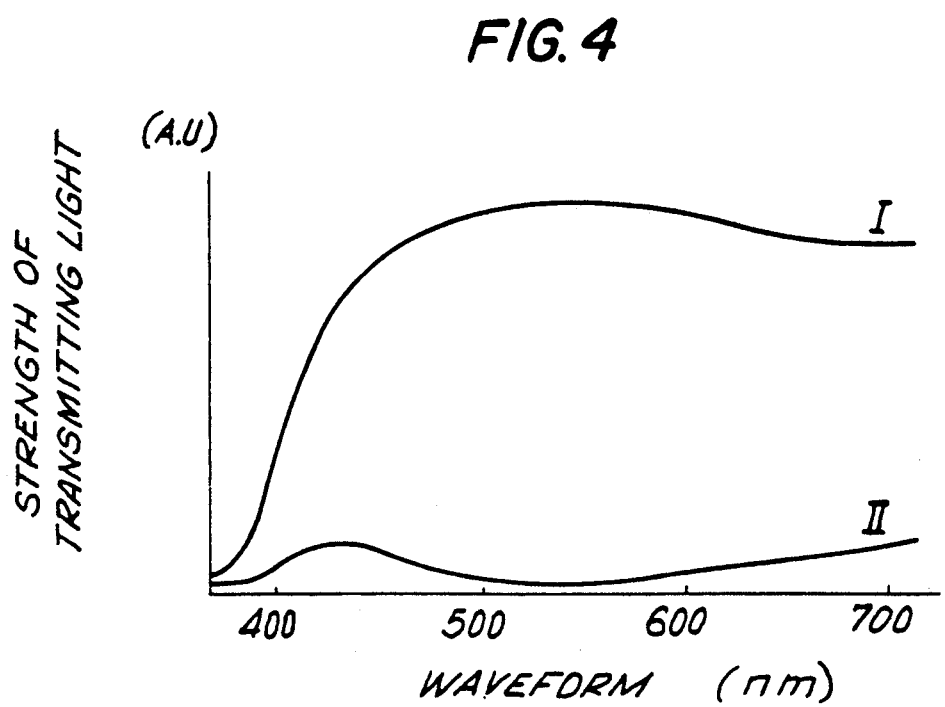
FIG. 4 is a graph of transmittance versus wavelength for a device prepared in accordance with the invention.
Figure 5:
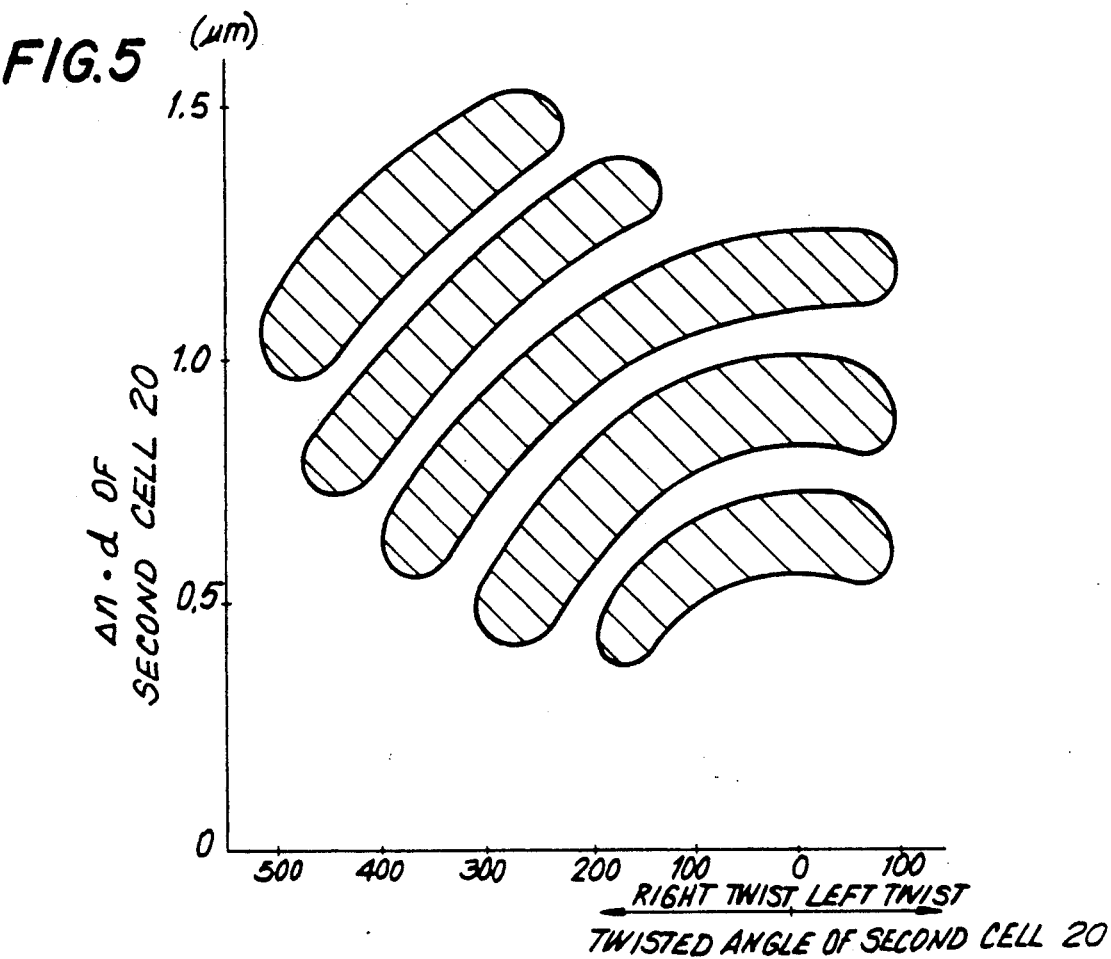
FIGS. 5–8 are additional plots of $\Delta n \cdot d$ versus twist angle of the second liquid crystal cell.

The actual value of $\Delta n \cdot d$ associated with conditions A, B and D of Tables 5 and 6 are within the range of oblique lines shown in FIGS. 3 and 5. Without a suitable voltage being applied to cell 20, an inferior monochromatic black and white display is produced. Application of a suitable voltage to cell 20, however, provides a monochromatic black and white display having excellent contrast.

EMBODIMENT 7

As shown below, Table 7 lists the predetermined and actual values of thickness d and predetermined and actual values of $\Delta n \cdot d$ of cells 10 and 20. The predetermined and actual values of thickness d differ from one another as do the predetermined and actual values of $\Delta n \cdot d$ for both cell 10 and cell 20. The same test conditions were used in obtaining the data for Tables 5, 6 and 7. When a suitable voltage was applied to cell 20, a monochromatic black and white display was produced having excellent contrast.

TABLE 7

| | First cell 10 ($\Delta n = 0.15$) | | | | Second cell 20 ($\Delta n = 0.1$) | | | |
|---|---|---|---|---|---|---|---|---|
| | d Pd value ($\mu$m) | d actual value ($\mu$m) | $\Delta n \cdot d$ Pd value ($\mu$m) | $\Delta n \cdot d$ actual value ($\mu$m) | d Pd value ($\mu$m) | d actual value ($\mu$m) | $\Delta n \cdot d$ Pd value ($\mu$m) | $\Delta n \cdot d$ actual value ($\mu$m) |
| Ex. 2 | 6.0 | 5.9 | 0.9 | 0.885 | 7.0 | 6.9 | 0.7 | 0.69 |
| | 6.0 | 6.1 | 0.9 | 0.915 | 7.0 | 7.2 | 0.7 | 0.72 |
| | 6.0 | 6.1 | 0.9 | 0.915 | 7.0 | 7.3 | 0.7 | 0.73 |
| Ex. 3 | 6.0 | 5.9 | 0.9 | 0.885 | 9.0 | 8.9 | 0.9 | 0.89 |
| | 6.0 | 5.9 | 0.9 | 0.885 | 9.0 | 9.1 | 0.9 | 0.91 |
| | 6.0 | 6.1 | 0.9 | 0.915 | 9.0 | 9.3 | 0.9 | 0.93 |

(Predetermined = Pd)

EMBODIMENT 8

Liquid crystal material 13 of cell 10 of device 50 includes 99.2% of biphenyl group liquid crystal and 0.8 wt% of S811 made by Merck Company. Liquid crystal material 23 of cell 20 of device 50 includes 99.55 wt% of bithenyl group liquid crystal and 1.45 wt% of CB-15 made by BDH Co. Liquid crystal material 13 and liquid crystal material 23 of cell 10 and cell 20 have thicknesses d of 5.8 $\mu$m and 6.4 $\mu$m, respectively. Angles $\theta_1$ and $\theta_2$ are approximately 45° and 90°, respectively. Twist angle T1 of cell 10 is approximately 180° to the left and twist angle T2 of cell 20 is approximately 180° to the right. Cell 10 and cell 20 have values of $\Delta n \cdot d$ of approximately 0.87 $\mu$m and 0.96 $\mu$m, respectively. A rectangular wave form having peaks of 2.03 volts is applied to cell 20. Device 50 produces a monochromatic black and white display having excellent contrast.

By providing that cell 20 has a larger value of $\Delta n \cdot d$ than the value of $\Delta n \cdot d$ of cell 10 and by applying a suitable voltage to electrodes 21a and 22a of cell 20 to adjust the value of $\Delta n \cdot d$ of cell 20 to correspond (i.e., be the same as) the value of $\Delta n \cdot d$ of cell 10, a black and white display having excellent contrast is provided. Such excellent contrast is displayed by device 50 in the same way as the above embodiments wherein the thickness d of the liquid crystal materials is set to a predetermined value by calculation.

Figure 15:
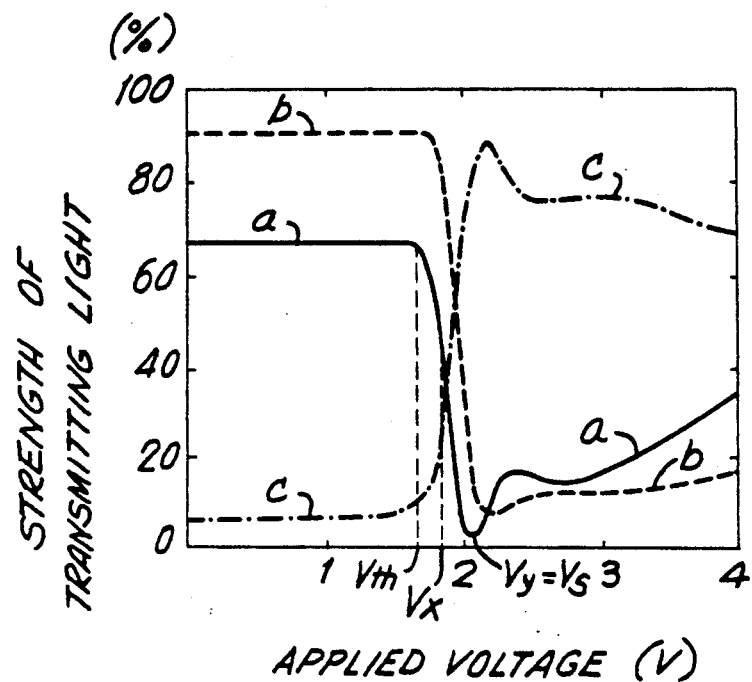
FIG. 15 is a plot of transmittance versus voltage applied to a first liquid crystal cell in a positive mode.
Figure 16:
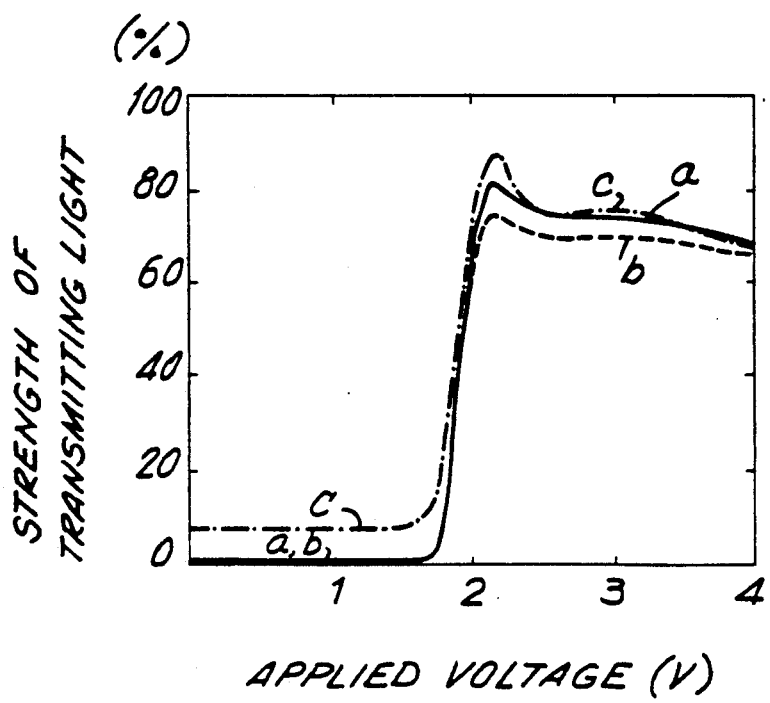
FIG. 16 is a plot of transmittance versus voltage applied to the first liquid crystal cell in a negative mode.
Figure 17A:
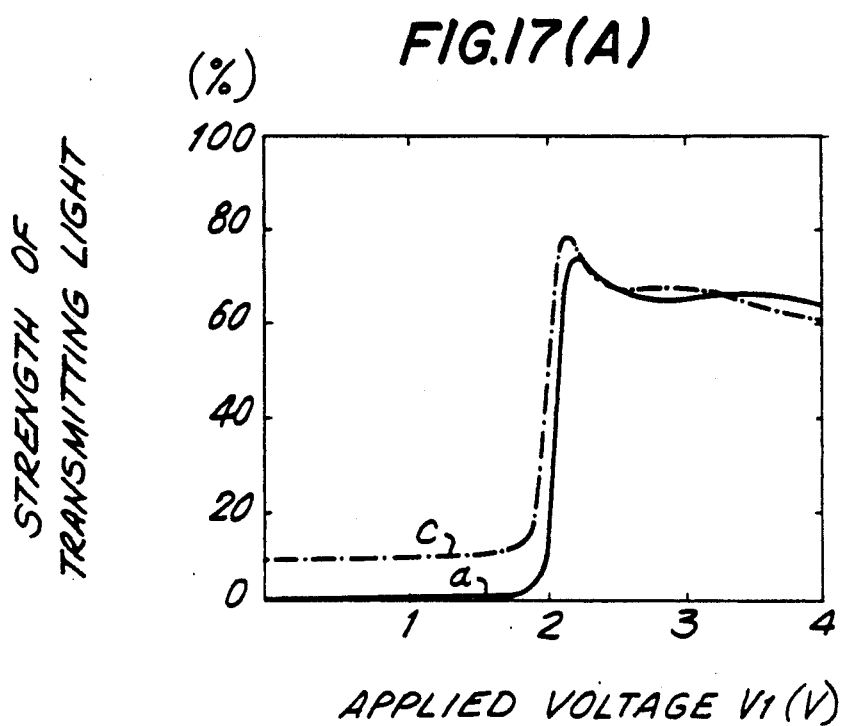
FIGS. 17(A)–17(E) are plots of transmittance versus voltage applied to the first liquid crystal cell in accordance with the invention.
Figure 17B:
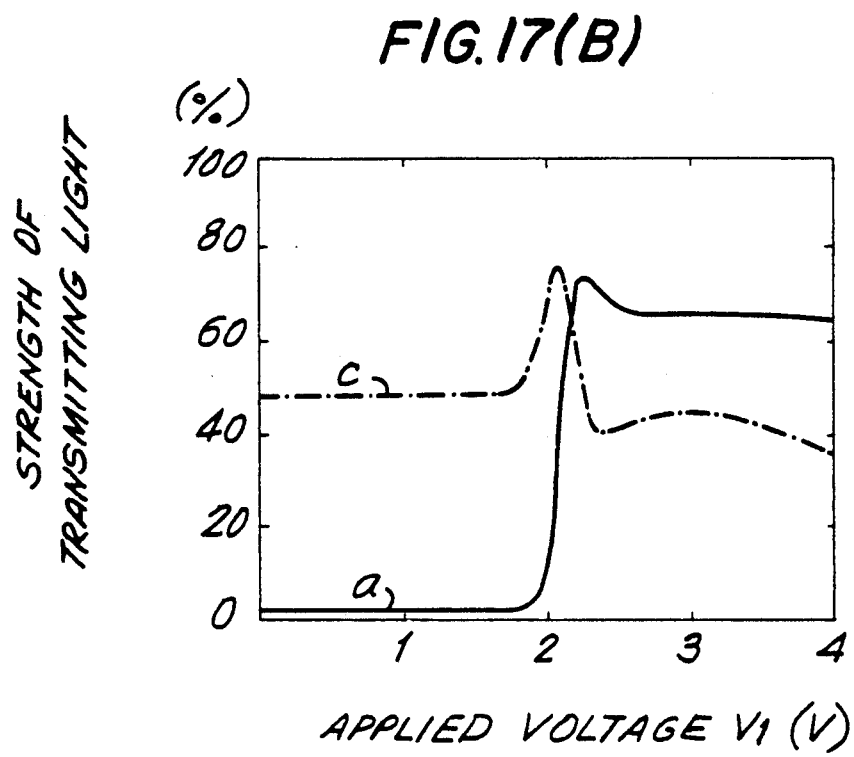
Figure 17C:
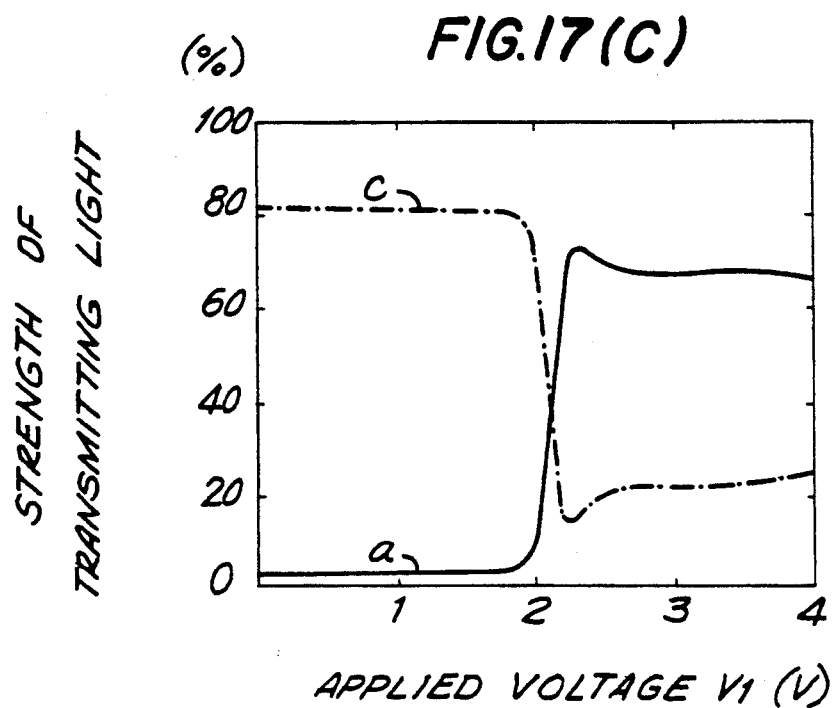
Figure 17D:
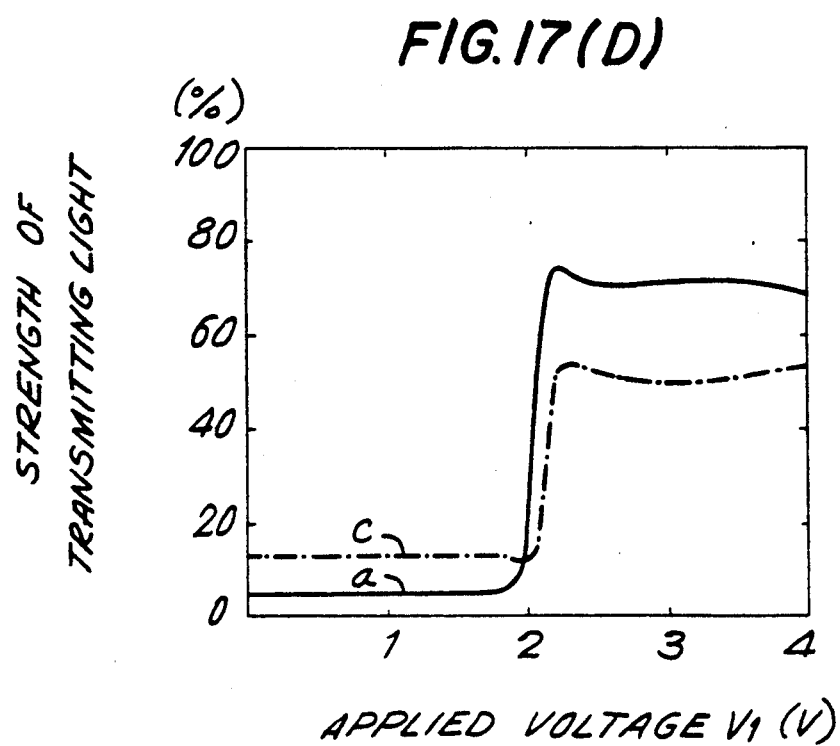
Figure 17E:
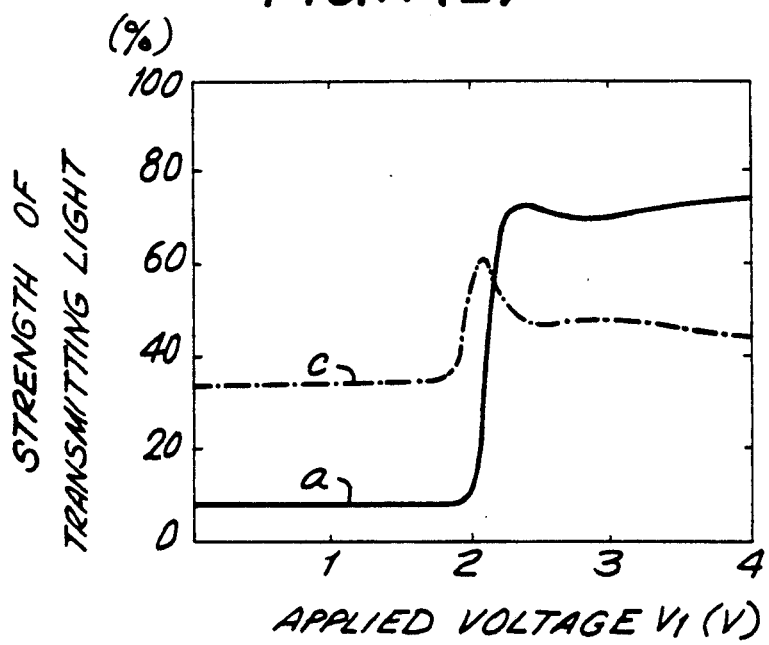
Figure 18:
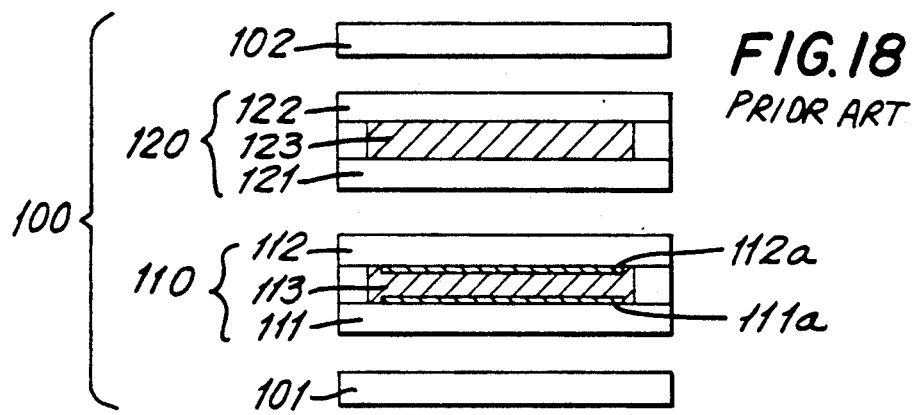
FIG. 18 is an exploded cross-sectional view of a prior art electro-optical device.
Figure 19:
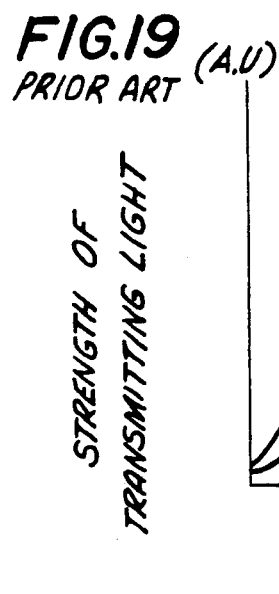
FIG. 19 is a plot of transmittance versus wavelength produced by the electro-optical device of FIG. 18.

FIGS. 15 and 16 illustrate the transmittance spectrums relative to a voltage V applied to electrodes 11a and 12a of cell 10 when in a positive mode and a negative mode, respectively. The conditions of device 50 which produce the transmittance spectrums of FIGS. 15 and 16 are set forth below in Table 8.

TABLE 8

| | | First cell 10 | | Second cell 20 | | Voltage applied to secone cell 20 [V] | Arrangement of polarizers | | |
|---|---|---|---|---|---|---|---|---|---|
| | | d ($\mu$m) | $\Delta n \cdot d$ ($\mu$m) | d ($\mu$m) | $\Delta n \cdot d$ ($\mu$m) | | angle $\theta_2$ | angle $\theta_1$ | relation between two polarizing plates |
| FIG. 15 | a | 5.8 | 0.87 | 6.4 | 0.96 | 2.03 | 45° | 45° | ⊥ |
| | b | 5.8 | 0.87 | 5.8 | 0.87 | 0 | −45° | 45° | ∥ |
| | c | 5.8 | 0.87 | 6.4 | 0.96 | 0 | 45° | 45° | ⊥ |
| FIG. 16 | a | 5.8 | 0.87 | 6.4 | 0.96 | 1.82 | 45° | 45° | ⊥ |
| | b | 5.8 | 0.87 | 5.8 | 0.87 | 0 | 45° | 45° | ⊥ |
| | c | 5.8 | 0.87 | 6.4 | 0.96 | 0 | 45° | 45° | ⊥ |

In FIGS. 15 and 16, curve a represents the transmittance properties of device 50 when a voltage of 2.03 volts is applied to cell 20, curve b represents the transmittance properties of a display device in accordance with the prior art and curve c represents the transmittance properties of device 50 when no voltage is applied to cell 20.

In FIG. 15, curves a and c are based on polarizing plates 1 and 2 having their polarizing (absorbing) axes perpendicular to one another, whereas in curve b the polarizing axes of polarizing plates 1 and 2 are parallel to one another.

In FIG. 16, the voltage applied to cell 20 is 1.82 volts rather than 2.03 volts in connection with curve a and the polarizing axes of polarizing plates 1 and 2 are perpendicular to one another with respect to curves a and c. The polarizing axes of polarizing plates 101 and 102 are also perpendicular to one another in connection with curve b. Conventional device 100 requires rearrangement of polarized plate 101 and 102 to switch from a positive (or negative) mode to a negative (or positive) mode. In accordance with the invention, however, switching of one mode to another can be achieved by appropriate multiplex driving.

In multiplex driving, the voltage applied to the electrodes changes between voltage $V_x$ and voltage $V_y$ to select either the ON or OFF state. The relationship between the number of duty N and $V_y/V_x$ is defined as follows:

$$V_y/V_x = ((N^{\frac{1}{2}}+1)/(N^{\frac{1}{2}}-1))^{\frac{1}{2}}$$

When N=200, the relationship between $V_y$ and $V_x$ is as follows:

$$V_y/V_x = 1.07$$

Referring once again to FIG. 15, the point along curve a at which the applied voltage causes the transmission level to drop is defined as $V_{th}$ having a value of 1.66 volts. Voltage $V_s$ having a value of 1.05 volts represents the voltage applied to second cell 20. Accordingly, $|V_y-V_x| < |V_s-V_{th}|$. Under such circumstances, an insufficient contrast is obtained by device 50. When $V_y=V_x$ is in the ON state, the display is sufficiently black to provide a maximum contrast ratio. In comparing curves a and b of FIG. 15, it is clear that device 50 provides a display having excellent contrast. In other words, by applying a suitable voltage to cell 20 of device 50 a display having far superior contrast compared to prior art electro-optical devices is achieved.

In comparing FIGS. 15 and 16, conventional display devices cannot switch the display modes (positive and negative) unless the arrangement of polarizing plates is changed. In accordance with the invention, however, by changing the voltage applied to cell 20, the display modes can be switched from one to the other. In particular, the invention provides that the display modes can be easily switched.

EMBODIMENT 9

Polarizing plates 1 and 2 are arranged in accordance with Embodiment 8. Thicknesses d of liquid crystal material 13 and liquid crystal material 23 of cell 10 and cell 20 are approximately 6.0 μm and 6.3 μm, respectively. The same transmittance characteristics as described with respect to Embodiment 8 are obtained.

EMBODIMENT 10

Polarizing plates 1 and 2 are arranged as discussed in connection with Embodiment 8. Liquid crystal material 13 and liquid crystal material 23 have thicknesses d of approximately 5.6 μm and 6.0 μm, respectively. The same transmittance characteristics as described in connection with Embodiment 8 are obtained.

EMBODIMENT 11

The surfaces of substrates 11 and 12 of cell 10 and substrates 21 and 22 of cell 20 are rubbed in predetermined directions to properly orient the molecules of liquid crystal material 13 and liquid crystal material 23, respectively. The surfaces of the substrates are obliquely evaporated to properly orient the liquid crystal molecules. The liquid crystal molecules adjacent the substrates are at pre-tilt angles of approximately 25°. Twist angles T1 and T2 are approximately 270°. Angles $\theta_1$ and $\theta_2$ are approximately 45° and the angle $\theta$ is 90°. Thicknesses d of liquid crystal material 13 and liquid crystal material 23 are approximately 5.7 μm and 6.2 μm, respectively. The same transmittance characteristics as described in connection with the above embodiments are obtained.

EMBODIMENT 12

Liquid crystal material 13 of cell 10 includes 98.9 wt% of tolan group liquid crystal and 1.1 wt% of S-811 made by Merck Co. Liquid crystal material 23 of cell 20 includes 98.8 wt% by tolan group liquid crystal and 1.2 wt% of CB-15 made by BDH Co. Twist angle T1 of cell 10 is approximately 230° to the left. Twist angle T2 of cell 20 is approximately 230° to the right. Liquid crystal material 13 has a thickness d of approximately 4.5 μm. Thickness d of liquid crystal material 23 is set at various values under conditions A-E of Table 9 listed below. All other conditions of device 50 are as described in connection with Embodiment 8. The same experiment was conducted.

TABLE 9

| | First cell 10 | | Second cell 20 | | Voltage applied to Second cell 20 V | Contrast Ratio |
|---|---|---|---|---|---|---|
| | d (μm) | Δn·d (μm) | d (μm) | Δn·d (μm) | | |
| A | 4.5 | 0.88 | 4.8 | 0.94 | 2.10 | 1:22 |
| B | 4.5 | 0.88 | 5.5 | 1.07 | 2.22 | 1:14 |
| C | 4.5 | 0.88 | 6.4 | 1.25 | 2.37 | 1:11 |
| D | 4.5 | 0.88 | 7.4 | 1.44 | 2.54 | 1:8 |
| E | 4.5 | 0.88 | 8.3 | 1.62 | 2.15 | 1:6 |

The contrast ratio listed in Table 9 is obtained when the level of transmittance is set to 50% in the OFF state and device 50 is driven under 1/240 duty.

FIGS. 17(A)–17(E) illustrate the transmittance characteristics relative to the voltage $V_1$ applied to cell 10 of device 50. Voltage $V_1$ is a rectangular waveform having a frequency of 1 k Hz. Transmittance of light at a level of 100% represents that substantially all light passes through polarizers 1 and 2 based on the polarizing axes of polarizers 1 and 2 being properly oriented relative to each other. A curve c denoted as a dot-dash line represents the transmittance when no voltage is applied to cell 20. Poor contrast and a color display results. A curve a represents the level of transmittance when voltage $V_1$ is applied to cell 10. Excellent contrast and a monochromatic black and white display results.

Conditions A-E of Table 9 correspond to and are represented by FIGS. 17(A)–17(E), respectively. The maximum voltage limit is applied to cell 20 as represented by FIGS. 17(A)–17(E). Insufficient contrast results when voltage V1 applied to cell 10 is 0 volts and the value of Δn·d increases. When a contrast ratio of 1:10 is required, a suitable voltage can be applied to cell 20 so that the value of Δn·d of cell 20 will presumably not be more than 0.4 μm of the value of Δn·d of cell 10.

As now can be readily appreciated, by providing that cell 20 includes electrodes 21a and 22a (and that cell 30 includes electrodes 31a and 32a) a voltage can be applied to these electrodes to compensate for changes in ambient temperature or manufacturing error in thickness d of the liquid crystal materials. A monochromatic black and white display having excellent contrast results. It is also possible to change the background color or display color by applying an appropriate voltage to cell 20 (and cell 30). Furthermore, device 50 (and device 60) permit electronic apparatuses incorporating an electro-optical device to have a greater range of design options.

By providing that $\Delta n \cdot d$ of cell 20 (and cell 30) is greater than the value of $\Delta n \cdot d$ of cell 10 and applying a suitable voltage to the electrodes of cell 20 (and cell 30), any color in the display, which may be produced due to ambient temperature conditions or manufacturing error in the liquid crystal material thicknesses, can be eliminated. Accordingly, the same high level of monochromatic black and white display produced when cells 10 and 20 are prepared so that $\Delta n \cdot d$ of each cell is the same results. A wider range of differences in thickness d of liquid crystal cell 10 and liquid crystal cell 20 is permitted resulting in a higher yield of electro-optical devices. A reduction in the manufacturing cost of and a simplified manufacturing process for electro-optical devices is achieved.

Contrast in the display produced by the electro-optical device in accordance with the invention is significantly improved and since the display mode (negative/positive) can be reversed in both the display portion and peripheral portions which are not scanned, reversal of the display modes can be easily accomplished as compared to conventional electro-optical devices. It is also easier to provide a superior display at the time that the display modes are reversed.

It will thus be seen that the objects set forth above, and those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention, which, as a matter of language, might be said to fall therebetween.

What is claimed is:

1. An electro-optical device, comprising:
    a first transparent twisted nematic liquid crystal cell including a pair of first spaced apart opposed substrates with transparent electrodes selectively disposed thereon, the opposed first substrates each having a liquid crystal orientation direction, and a first twisted nematic liquid crystal material disposed in the space between the first substrates and having a twist angle greater than 90°;
    a second transparent twisted nematic liquid crystal cell adjacent to the first liquid crystal cell, the second cell including a pair of second spaced apart opposed substrates with transparent electrodes selectively disposed thereon, the opposed second substrates each having a liquid crystal orientation direction, and a second twisted nematic liquid crystal material disposed in the space between the second substrates, having a twist angle greater than 90° and characterized by a product of refractive index of anisotropy $\Delta n$ and thickness d which varies based on ambient temperature conditions; and
    a linear polarizer disposed on exterior surfaces of the first twisted nematic liquid crystal cell and the second twisted nematic liquid crystal cell;
    wherein linearly polarized light entering the device through the polarizer adjacent to the first cell is emitted from the first cell as elliptically polarized light, passes through the second cell and is emitted from the second cell as substantially linearly polarized light by varying the voltage applied to the transparent electrodes of the second cell in accordance with ambient temperature conditions.

2. The electro-optical device of claim 1, wherein a product of refractive index of anisotropy $\Delta n$ and thickness d of the second twisted nematic liquid crystal cell is greater than a product of refractive index anisotropy $\Delta n$ and a thickness d of the first twisted nematic liquid crystal cell in the absence of voltage applied to the electrodes of the first twisted nematic liquid crystal cell and the electrodes of the second twisted nematic liquid crystal cell.

3. The electro-optical device of claim 1, wherein the first twisted nematic liquid crystal material and the second twisted nematic liquid crystal material are twisted in opposite directions.

4. The electro-optical device of claim 3, wherein a product of refractive index of anisotropy $\Delta n$ and thickness d of the second twisted nematic liquid crystal cell is greater than a product of refractive index anisotropy $\Delta n$ and a thickness d of the first twisted nematic liquid crystal cell in the absence of voltage applied to the electrodes of the first twisted nematic liquid crystal cell and the electrodes of the second twisted nematic liquid crystal cell.

5. The electro-optical device of claim 1, wherein one of the substrates of the first cell is in contact with one of the substrates of the second cell.

6. The electro-optical device of claim 5, wherein the adjacent substrates in contact are integrally formed as one substrate.

7. The electro-optical device of claim 5, wherein a product of refractive index of anisotropy $\Delta n$ and thickness d of the second twisted nematic liquid crystal cell is greater than a product of refractive index anisotropy $\Delta n$ and a thickness d of the first twisted nematic liquid crystal cell in the absence of voltage is applied to the electrodes of the first twisted nematic liquid crystal cell and the electrodes of the second twisted nematic liquid crystal cell.

8. The electro-optical device of claim 5, wherein at least one of the substrates of the second cell has at least two electrodes disposed thereon.

9. The electro-optical device of claim 1, wherein at least one of the substrates of the second cell has at least two electrodes disposed therein.

10. The electro-optical device of claim 9, wherein the electrodes in the first cell define a first display region through which light can pass selectively to form a desired display which encompasses a second display region defined by the electrodes of the second substrates, the two display regions overlapping one another in plan view.

11. The electro-optical device of claim 9, wherein the electrodes in the first cell define a first display region through which light can pass selectively to form a desired display which is encompassed by a second display region defined by the electrodes of the second substrates, the two display regions overlapping one another in plan view.

12. The electro-optical device of claim 9, wherein a product of refractive index of anisotropy $\Delta n$ and thickness d of the second twisted nematic liquid crystal cell is greater than a product of refractive index anisotropy Δn and a thickness d of the first twisted nematic liquid crystal cell in the absence of voltage applied to the electrodes of the first twisted nematic liquid crystal cell and the electrodes of the second twisted nematic liquid crystal cell.

13. The electro-optical device of claim 1, wherein the electrodes in the first cell define a first display region through which light can pass selectively to form a desired display which encompasses a second display region defined by the electrodes of the second substrates, the two display regions overlapping one another in plan view.

14. The electro-optical device of claim 13, wherein a product of refractive index of anisotropy Δn and thickness d of the second twisted nematic liquid crystal cell is greater than a product of refractive index anisotropy Δn and a thickness d of the first twisted nematic liquid crystal cell in the absence of voltage applied to the electrodes of the first twisted nematic liquid crystal cell and the electrodes of the second twisted nematic liquid crystal cell.

15. The electro-optical device of claim 1, wherein the electrodes in the first cell define a first display region through which light can pass selectively to form a desired display which is encompassed by a second display region defined by the electrodes of the second substrates, the two display regions overlapping one another in plan view.

16. The electro-optical device of claim 15, wherein a product of refractive index of anisotropy Δn and thickness d of the second twisted nematic liquid crystal cell is greater than a product of refractive index anisotropy Δn and a thickness d of the first twisted nematic liquid crystal cell in the absence of voltage applied to the electrodes of the first twisted nematic liquid crystal cell and the electrodes of the second twisted nematic liquid crystal cell.

17. The electro-optical device of claim 1, further including at least a third transparent twisted nematic liquid crystal cell including a pair of third spaced apart opposed substrates with transparent electrodes selectively disposed on the opposed third substrates, each having a liquid crystal orientation direction, and a third twisted nematic liquid crystal material disposed in the space between the third substrates, the third cell disposed between the pair of polarizers.

18. The electro-optical device of claim 17, wherein at least one of said second and third twisted nematic liquid crystal materials is twisted in an opposite direction to the first twisted nematic liquid crystal material.

19. The electro-optical device of claim 17, wherein the third twisted nematic liquid crystal material has a twist angle of greater than 90°.

20. The electro-optical device of claim 17, wherein one of the substrates of the first cell is in contact with one of the substrates of the second cell and the other substrate of the first cell contacts one of the pair of third substrates.

21. The electro-optical device of claim 20, wherein the adjacent substrates in contact are formed as one integral substrate.

22. The electro-optical device of claim 21, wherein the electrodes disposed on one of the substrates in the second cell are electrically connected to the electrodes on one surface of the first cell.

23. The electro-optical device of claim 17, wherein at least one of the substrates of the second cell has at least two electrodes disposed thereon.

24. The electro-optical device of claim 17, wherein a product of refractive index of anisotropy Δn and thickness d of the second twisted nematic liquid crystal cell is greater than a product of refractive index anisotropy Δn and a thickness d of the first twisted nematic liquid crystal cell in the absence of voltage applied to the electrodes of the first twisted nematic liquid crystal cell and the electrodes of the second twisted nematic liquid crystal cell.

25. A method of fabricating a liquid crystal display device comprising:
disposing a twisted nematic liquid crystal material in the space between two first electrode substrates to form a first cell having a twist angle of greater than 90°;
disposing a twisted nematic liquid crystal material in the space between two second electrode substrates to form a second cell having a twist angle of greater than 90°;
placing the second cell adjacent to the first cell; and
sandwiching the first cell and the second cell between two polarizers.

26. The method of claim 25, further including placing at least one third cell between the polarizers.

27. The method of claim 25 further including adhesively bonding together one of the two first electrode substrates of the first cell and one of the two second electrode substrates together.

28. The method of claim 27, wherein the adhesive bond is selected from the group materials consisting of polyvinyl butyral, epoxy, urethane and acrylic.

* * * * *